(12) United States Patent
Choi et al.

(10) Patent No.: US 11,546,926 B2
(45) Date of Patent: Jan. 3, 2023

(54) BIDIRECTIONAL POSITIONING REFERENCE SIGNAL MEASUREMENT EXCHANGE IN MILLIMETER WAVE-BASED ROUND TRIP TIME POSITIONING

(71) Applicant: QUALCOMM INCORPORATED, San Diego, CA (US)

(72) Inventors: Chang-Sik Choi, Seoul (KR); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/446,126

(22) Filed: Aug. 26, 2021

(65) Prior Publication Data
US 2022/0070883 A1 Mar. 3, 2022

Related U.S. Application Data

(60) Provisional application No. 63/071,869, filed on Aug. 28, 2020.

(51) Int. Cl.
*H04W 72/04* (2009.01)
*H04W 72/12* (2009.01)
*H04L 5/00* (2006.01)

(52) U.S. Cl.
CPC ......... *H04W 72/1231* (2013.01); *H04L 5/005* (2013.01); *H04W 72/044* (2013.01); *H04W 72/048* (2013.01)

(58) Field of Classification Search
CPC ............. H04W 72/044; H04W 72/048; H04W 72/1231; H04W 4/02; H04W 4/40;
(Continued)

(56) References Cited

U.S. PATENT DOCUMENTS

| 11,178,551 | B2* | 11/2021 | Kim | H04W 64/00 |
| 2019/0044677 | A1* | 2/2019 | Ly | H04B 7/088 |
| 2019/0068315 | A1* | 2/2019 | Rydén | G01S 1/0423 |

FOREIGN PATENT DOCUMENTS

| EP | 3648496 A1 | 5/2020 |
| WO | WO-2019197036 A1 | 10/2019 |
| WO | WO-2020146739 A1 | 7/2020 |

OTHER PUBLICATIONS

International Search Report and Written Opinion—PCT/US2021/047933—ISA/EPO—dated Jan. 5, 2022 (206031WO).

* cited by examiner

*Primary Examiner* — Siu M Lee
(74) *Attorney, Agent, or Firm* — Qualcomm Incorporated

(57) ABSTRACT

Methods, systems, and devices for wireless communications are described. A device may receive a directional positioning reference signal over one or more beams from another device. The device may transmit a broadcast positioning reference signal in response to receipt of the directional positioning reference signal. The device may receive, from the other device, a report including timing and directionality associated with transmission of the directional positioning reference signal. The report may also include timing and directionality associated with receipt of the broadcast positioning reference signal at the other device. Responsive to receipt of the report, the device may transmit beam specific measurement information associated with the one or more beams to the other device. The device may communicate with the other device using a beam of the one or more beams based at least on the report and the beam specific measurement information.

30 Claims, 13 Drawing Sheets

(58) Field of Classification Search
CPC ..... H04W 24/08; H04W 24/10; H04W 92/18; H04L 5/005; G01S 13/765; G01S 1/08; G01S 5/02; G01S 5/0205; H04B 7/0695
See application file for complete search history.

BIDIRECTIONAL POSITIONING REFERENCE SIGNAL MEASUREMENT EXCHANGE IN MILLIMETER WAVE-BASED ROUND TRIP TIME POSITIONING

CROSS REFERENCE

The present Application for Patent claims the benefit of U.S. Provisional Patent Application No. 63/071,869 by Choi et al., entitled "BIDIRECTIONAL POSITIONING REFERENCE SIGNAL MEASUREMENT EXCHANGE IN MILLIMETER WAVE-BASED ROUND TRIP TIME POSITIONING," filed Aug. 28, 2020, assigned to the assignee hereof, and expressly incorporated by reference herein.

FIELD OF TECHNOLOGY

The following relates to wireless communications, including bidirectional positioning reference signal (PRS) measurement exchange in millimeter wave (mmW)-based round trip time (RTT) positioning.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, the multiple-access communications system may include non-anchor devices (e.g., a UE not capable of accurately determining its position) and anchor devices (e.g., a UE capable of accurately determining its position, for example, a roadside unit (RSU)).

SUMMARY

The described techniques relate to improved methods, systems, devices, and apparatuses that support bidirectional positioning reference signal measurement exchange in millimeter wave (mmW)-based round trip time (RTT) positioning. Generally, the described techniques provide for the reporting of beam specific measurement information from a non-anchor device to an anchor device (or another non-anchor device) with respect to directional positioning reference signal transmissions from the anchor device to the non-anchor device.

A method for wireless communication at a first wireless device is described. The method may include receiving a directional positioning reference signal over one or more beams of a set of beams, transmitting a broadcast positioning reference signal in response to receipt of the directional positioning reference signal, receiving, from a second wireless device, a report including timing and directionality associated with transmission of the directional positioning reference signal and receipt of the broadcast positioning reference signal at the second wireless device, transmitting, to the second wireless device and responsive to receipt of the report, beam specific measurement information associated with the one or more beams of the set of beams, and communicating with the second wireless device using a beam of the one or more beams based on the report and the beam specific measurement information.

An apparatus for wireless communication at a first wireless device is described. The apparatus may include one or more transceivers, one or more memory, and one or more processors electronically coupled to the one or more memory and the one or more transceivers. The one or more processors may be configured to receive, via the one or more transceivers, a directional positioning reference signal over one or more beams of a set of beams, transmit, via the one or more transceivers, a broadcast positioning reference signal in response to receipt of the directional positioning reference signal, receive, via the one or more transceivers and from a second wireless device, a report including timing and directionality associated with transmission of the directional positioning reference signal and receipt of the broadcast positioning reference signal at the second wireless device, transmit, via the one or more transceivers and to the second wireless device and responsive to receipt of the report, beam specific measurement information associated with the one or more beams of the set of beams, and communicate with the second wireless device using a beam of the one or more beams based on the report and the beam specific measurement information.

Another apparatus for wireless communication at a first wireless device is described. The apparatus may include means for receiving a directional positioning reference signal over one or more beams of a set of beams, means for transmitting a broadcast positioning reference signal in response to receipt of the directional positioning reference signal, means for receiving, from a second wireless device, a report including timing and directionality associated with transmission of the directional positioning reference signal and receipt of the broadcast positioning reference signal at the second wireless device, means for transmitting, to the second wireless device and responsive to receipt of the report, beam specific measurement information associated with the one or more beams of the set of beams, and means for communicating with the second wireless device using a beam of the one or more beams based on the report and the beam specific measurement information.

A non-transitory computer-readable medium storing code for wireless communication at a first wireless device is described. The code may include instructions executable by a processor to receive a directional positioning reference signal over one or more beams of a set of beams, transmit a broadcast positioning reference signal in response to receipt of the directional positioning reference signal, receive, from a second wireless device, a report including timing and directionality associated with transmission of the directional positioning reference signal and receipt of the broadcast positioning reference signal at the second wireless device, transmit, to the second wireless device and responsive to receipt of the report, beam specific measurement information associated with the one or more beams of the set of beams, and communicate with the second wireless device using a beam of the one or more beams based on the report and the beam specific measurement information.

Some examples of the method, apparatuses, and non-transitory computer-readable medium described herein may further include operations, features, means, or instructions for determining a reference signal received power value for each beam of the one or more beams based on receipt of the directional positioning reference signal over each of the one or more beams and assigning a rank to each of the one or more beams based on a corresponding reference signal received power value determined for the one or more beams.

Some examples of the method, apparatuses, and non-transitory computer-readable medium described herein may further include operations, features, means, or instructions for transmitting at least one of the determined reference signal received power value or the assigned rank for at least one of the one or more beams.

Some examples of the method, apparatuses, and non-transitory computer-readable medium described herein may further include operations, features, means, or instructions for transmitting at least one of a temporal instance and a direction associated with receipt of the directional positioning reference signal over the one or more beams.

Some examples of the method, apparatuses, and non-transitory computer-readable medium described herein may further include operations, features, means, or instructions for selecting the beam of the one or more beams based on reference signal received power values for the one or more beams and transmitting at least one of a set of beam indexes or a beam pattern associated with each beam of the one or more beams.

Some examples of the method, apparatuses, and non-transitory computer-readable medium described herein may further include operations, features, means, or instructions for receiving an indication of the beam of the one or more beams based on transmitting the beam specific measurement information.

Some examples of the method, apparatuses, and non-transitory computer-readable medium described herein may further include operations, features, means, or instructions for receiving at least one of a temporal instance or a direction associated with transmission of the directional positioning reference signal over the one or more beams by the second wireless device and receiving at least one of a temporal instance or a direction associated with reception of the broadcast positioning reference signal at the second wireless device.

In some examples of the method, apparatuses, and non-transitory computer-readable medium described herein, the first wireless device includes a non-anchor device in an RTT positioning scheme and the second wireless device includes an anchor device in the RTT positioning scheme.

In some examples of the method, apparatuses, and non-transitory computer-readable medium described herein, the first wireless device includes a non-anchor device in an RTT positioning scheme and the second wireless device includes another non-anchor device in the RTT positioning scheme.

In some examples of the method, apparatuses, and non-transitory computer-readable medium described herein, the second wireless device includes a roadside unit (RSU) in an RTT positioning scheme.

A method for wireless communication at a second wireless device is described. The method may include transmitting a directional positioning reference signal over a set of beams, receiving, from a first wireless device and in response to receipt of the directional positioning reference signal at the first wireless device over one or more beams of the set of beams, a broadcast positioning reference signal, transmitting, to the first wireless device, a report including timing and directionality associated with transmission of the directional positioning reference signal and receipt of the broadcast positioning reference signal at the second wireless device, receiving, from the first wireless device and responsive to receipt of the report at the first wireless device, beam specific measurement information associated with the one or more beams of the set of beams, and communicating with the first wireless device using a beam of the one or more beams based on the report and the beam specific measurement information.

An apparatus for wireless communication at a second wireless device is described. The apparatus may include one or more transceivers, one or more memory, and one or more processors electronically coupled to the one or more memory and the one or more transceivers. The one or more processors may be configured to transmit, via the one or more transceivers, a directional positioning reference signal over a set of beams, receive, via the one or more transceivers and from a first wireless device and in response to receipt of the directional positioning reference signal at the first wireless device over one or more beams of the set of beams, a broadcast positioning reference signal, transmit, via the one or more transceivers and to the first wireless device, a report including timing and directionality associated with transmission of the directional positioning reference signal and receipt of the broadcast positioning reference signal at the second wireless device, receive, via the one or more transceivers and from the first wireless device and responsive to receipt of the report at the first wireless device, beam specific measurement information associated with the one or more beams of the set of beams, and communicate with the first wireless device using a beam of the one or more beams based on the report and the beam specific measurement information.

Another apparatus for wireless communication at a second wireless device is described. The apparatus may include means for transmitting a directional positioning reference signal over a set of beams, means for receiving, from a first wireless device and in response to receipt of the directional positioning reference signal at the first wireless device over one or more beams of the set of beams, a broadcast positioning reference signal, means for transmitting, to the first wireless device, a report including timing and directionality associated with transmission of the directional positioning reference signal and receipt of the broadcast positioning reference signal at the second wireless device, means for receiving, from the first wireless device and responsive to receipt of the report at the first wireless device, beam specific measurement information associated with the one or more beams of the set of beams, and means for communicating with the first wireless device using a beam of the one or more beams based on the report and the beam specific measurement information.

A non-transitory computer-readable medium storing code for wireless communication at a second wireless device is described. The code may include instructions executable by a processor to transmit a directional positioning reference signal over a set of beams, receive, from a first wireless device and in response to receipt of the directional positioning reference signal at the first wireless device over one or more beams of the set of beams, a broadcast positioning reference signal, transmit, to the first wireless device, a report including timing and directionality associated with transmission of the directional positioning reference signal and receipt of the broadcast positioning reference signal at the second wireless device, receive, from the first wireless device and responsive to receipt of the report at the first wireless device, beam specific measurement information associated with the one or more beams of the set of beams, and communicate with the first wireless device using a beam of the one or more beams based on the report and the beam specific measurement information.

In some examples of the method, apparatuses, and non-transitory computer-readable medium described herein, and the method, apparatuses, and non-transitory computer-readable medium may include further operations, features, means, or instructions for a reference signal received power value for each beam of the one or more beams associated with the directional positioning reference signal and a rank associated with each beam of the one or more beams with respect to at least the reference signal received power values.

In some examples of the method, apparatuses, and non-transitory computer-readable medium described herein, the beam specific measurement information further includes at least one of a temporal instance or a direction associated with the directional positioning reference signal as received over the one or more beams by the first wireless device.

Some examples of the method, apparatuses, and non-transitory computer-readable medium described herein may further include operations, features, means, or instructions for receiving at least one of a set of beam indexes or a beam pattern associated with each beam of the one or more beams.

Some examples of the method, apparatuses, and non-transitory computer-readable medium described herein may further include operations, features, means, or instructions for transmitting an indication of the beam of the one or more beams based on receiving the beam specific measurement information.

Some examples of the method, apparatuses, and non-transitory computer-readable medium described herein may further include operations, features, means, or instructions for transmitting at least one of a temporal instance or a direction associated with transmitting the directional positioning reference signal over the one or more beams and transmitting at least one of a temporal instance or a direction associated with reception of the broadcast positioning reference signal at the second wireless device.

In some examples of the method, apparatuses, and non-transitory computer-readable medium described herein, the first wireless device includes a non-anchor device in an RTT positioning scheme and the second wireless device includes an anchor device in the RTT positioning scheme.

In some examples of the method, apparatuses, and non-transitory computer-readable medium described herein, the first wireless device includes a non-anchor device in an RTT positioning scheme and the second wireless device includes another non-anchor device in the RTT positioning scheme.

In some examples of the method, apparatuses, and non-transitory computer-readable medium described herein, the second wireless device includes an RSU in an RTT positioning scheme.

DETAILED DESCRIPTION

Figure 1:
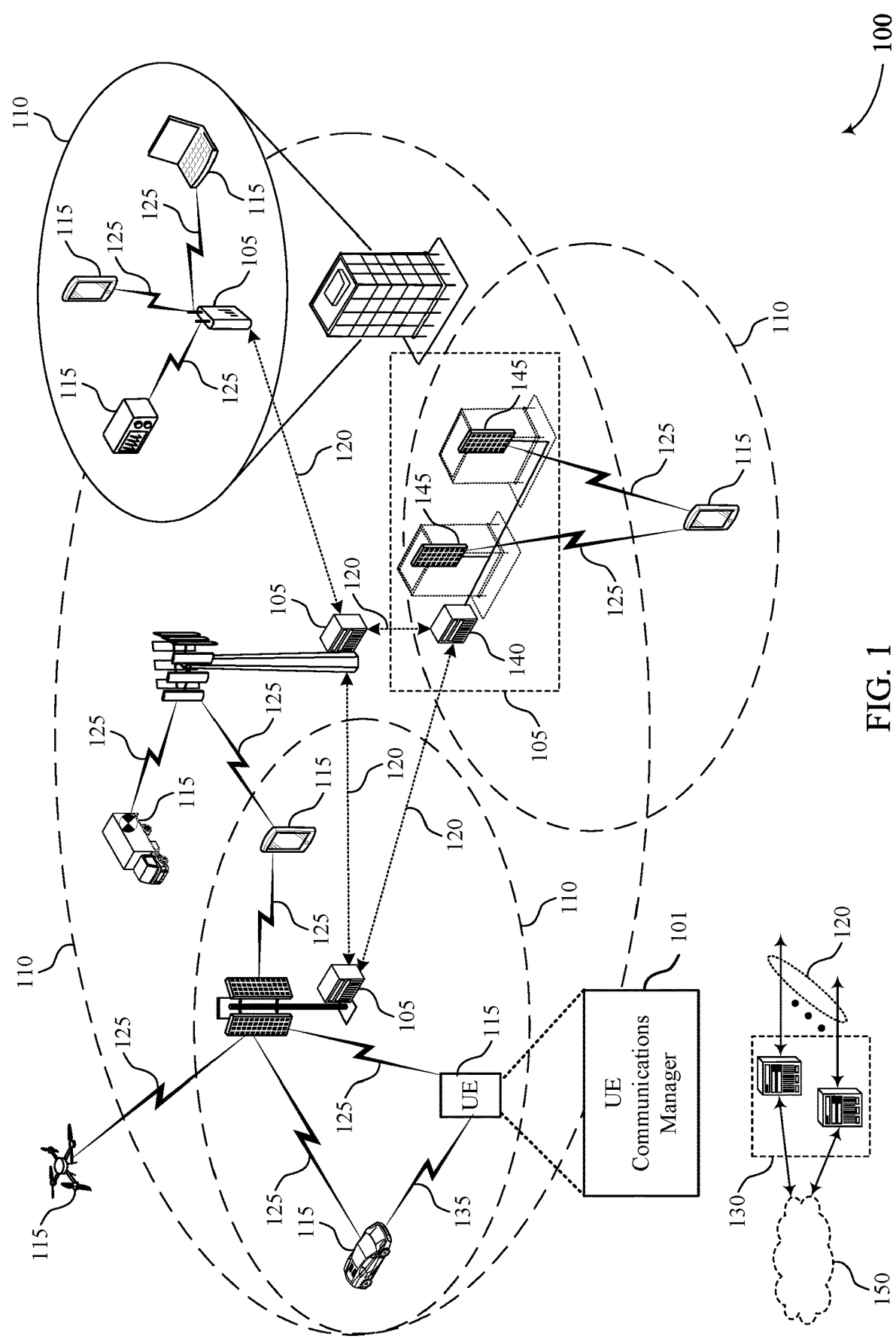
FIG. 1 illustrates an example of a system for wireless communications that supports bidirectional positioning reference signal measurement exchange in millimeter wave (mmW)-based round trip time (RTT) positioning in accordance with aspects of the present disclosure.

Devices in a wireless communications system may engage in forms of decentralized communication, for example, using peer-to-peer communication. Examples of peer-to-peer communications may include device-to-device (D2D) communications such as sidelink communications. Devices in D2D communication systems may benefit from being aware of respective positions or locations of devices within the system. To this end, a D2D communication system may include anchor devices and non-anchor devices. An example of an anchor device includes a wireless device that is capable of accurately determining its position (at least within a threshold distance or accuracy). An example of a non-anchor device includes a device that is not capable of accurately determining its position (at least within the threshold distance or accuracy). A non-anchor device may estimate its position using sidelink positioning techniques (e.g., a round trip time (RTT)-based approach), as explained herein. In some cases, the non-anchor device may estimate its position based on positioning reference signals broadcast by anchor devices.

In order to determine relative or absolute positions, both anchor devices and non-anchor devices may, at least in some cases, each broadcast a respective positioning reference signal. For example, an anchor device may transmit a positioning reference signal (e.g., a directional positioning reference signal) over one or more beams. A non-anchor device may receive the directional positioning reference signal over at least one of the one or more beams. Additionally, the non-anchor device may transmit a positioning reference signal (e.g., a broadcast positioning reference signal) which may be received at the anchor device.

In an example, the non-anchor device may receive an Intelligent Transport System (ITS) message from an anchor device after the anchor device has transmitted its positioning reference signal and after the non-anchor device has transmitted its positioning reference signal. The non-anchor device may receive the ITS message from the anchor device indicative of timing information for either or both the positioning reference signal transmitted by the non-anchor device and the positioning reference signal transmitted by the anchor device. Using information included in the ITS message, the non-anchor device may estimate its own position and clock error.

However, in millimeter wave (mmW) communications, penetration or coverage of transmitted positioning reference signals may be constrained due to narrow beam widths and interfering objects. In some cases, when positioning reference signals are broadcast directionally over different beams (e.g., exploiting beam patterns available to a transmitting device), the positioning reference signals may be differently impacted due to different channel realizations (e.g., channel quality, channel occupancy) associated with the beams. Accordingly, mmW-based positioning may be unreliable and have increased latency.

The challenges raised by mmW communications are largely addressed through a focus on more directional or focused beam transmissions. As described herein, not only may an anchor device (e.g., a roadside unit (RSU)) use directional communications for transmission of its positioning reference signals, but a non-anchor device may measure and inform the anchor device of the directional beams to which the non-anchor device is most receptive. Thus, and for example, a non-anchor device may receive a directional positioning reference signal over one or more beams. The non-anchor device may transmit a broadcast positioning reference signal in response to receipt of the directional positioning reference signal (e.g., from an anchor device or another non-anchor device). The non-anchor device may receive, from the anchor device (or the other non-anchor device), a report including timing and directionality associated with transmission of the directional positioning reference signal. The report may also include timing and directionality associated with receipt of the broadcast positioning reference signal at the anchor device. Responsive to receipt of the report, the non-anchor device may transmit beam specific measurement information (e.g., reference signal received power (RSRP)) values, beam rankings based on the RSRP values) associated with the one or more beams to the anchor device. The non-anchor device may communicate with the anchor device using a beam of the one or more beams based at least on the report and the beam specific measurement information.

Aspects of the subject matter described herein may be implemented to realize one or more advantages. The described techniques may support improvements in spectral efficiency and reliability, among other advantages. In some aspects, receiving a report including timing and directionality associated with transmission of a directional positioning reference signal, and communicating with another device using a beam selected based on respective beam specific measurement information may provide for successful broadcasting (e.g., directionally) of positioning reference signals, which may avoid potential transmission blockages and subsequent retransmissions. Such techniques may provide for increased spectrum utilization, increased spectral efficiency, and improved reliability.

Aspects of the disclosure are initially described in the context of wireless communications systems. Examples of processes and signaling exchanges that support the reporting of beam specific measurement information from a non-anchor device to an anchor device (or another non-anchor device) with respect to directional positioning reference signal transmissions from the anchor device to the non-anchor device are described. Aspects of the disclosure are further illustrated by and described with reference to apparatus diagrams, system diagrams, and flowcharts that relate to bidirectional positioning reference signal measurement exchange in mmW-based RTT positioning.

FIG. 1 illustrates an example of a wireless communications system 100 that supports bidirectional positioning reference signal measurement exchange in mmW-based RTT positioning in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In some examples, a UE 115 may include or be referred to as a non-anchor device (e.g., a UE not capable of accurately (within a threshold) determining its position) or an anchor device (e.g., a UE capable of accurately (within a threshold) determining its position).

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA).

Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Accordingly, wireless communications system 100 may support various techniques for sidelink positioning in a group of UEs 115, such as RTT-based sidelink positioning. As an example, a UE 115 may be a group owner of the group of UEs. For example, the UE 115 may be a UE configured by an upper layer to be the group owner, or the UE 115 may perform group owner functions for the group of UEs, or a combination thereof. The group owner UE 115 may receive traffic information of other UEs 115 (e.g., from an upper layer, from the other UEs 115, or both). In some examples, the other UEs 115 in the group of UEs 115 may be referred to as "member" UEs 115. A member UE 115 may communicate with the group of UEs 115 using sidelink communications. In some examples, a member UE 115 may continuously monitor for sidelink communications (e.g., positioning reference signals (PRSs)) from other member UEs 115 of the group of UEs 115.

As described herein, a group of UEs 115 supporting RTT-based sidelink positioning may include roadside units (RSUs) and vehicles (e.g., on-board units (OBUs) mounted to the vehicles). An RSU may be a dedicated short range communications (DSRC) transceiver mounted along a road or pedestrian passageway. An RSU may be mounted on a vehicle or be hand carried, and the RSU may operate when the vehicle or the RSU (when hand carried) is stationary. An RSU may broadcast data to OBUs (e.g., mounted to a vehicle) or exchange data with the OBUs.

In some cases, the RSU may serves as a gateway between OBUs and a communications infrastructure (e.g., the wireless communications system 100). For example, an RSU may provide channel assignments and operating instructions to OBUs in a communications zone of the RSU. In some examples, an RSU may provide connectivity and information support to passing vehicles (e.g., OBUs mounted to the vehicles), such as safety warnings and traffic information. The RSUs and vehicles may be associated or configured as a group by an upper layer. In some aspects, for operation in unlicensed radio frequency spectrum bands, the RSUs and vehicles may perform group LBT operations. In some examples, an initiator of the group LBT operations may reserve channel occupancy time (CoT) for the initiator and associated responders.

In some aspects, the group of UEs 115 supporting RTT-based sidelink positioning may include non-anchor devices (e.g., a UE 115 not capable of accurately (within a threshold) determining its position) and anchor devices (e.g., a UE 115 capable of accurately determining its position). In some examples, a non-anchor device may include a UE 115 associated with a pedestrian (e.g., a portable device carried or worn by a user). In some examples, a non-anchor device may include a UE 115 associated with a vehicle that is not coupled with an accurate (e.g., having an accuracy above a threshold) positioning system. In some other examples, a non-anchor device may include a vehicle moving at a speed above a speed threshold. In some examples, an anchor device may include a UE 115 such as an RSU, a vehicle that is coupled with an accurate positioning system, a vehicle that is stationary and coupled with an accurate positioning system, or an OBU coupled to the vehicle.

A non-anchor device may estimate its position using sidelink positioning (e.g. a RTT-based approach), for example, based on positioning reference signals broadcast by (e.g., exchanged between) the non-anchor device and an anchor device (or another non-anchor device). For example, the non-anchor device and the anchor device (or other non-anchor device) may each broadcast a respective positioning reference signal. In some aspects, RTT-based sidelink positioning for a group of UEs 115 may support post-positioning reference signal messaging between group members (e.g., broadcasting of post-positioning reference signal messages). The messaging may include location information computed using sidelink-based (SL-b) positioning in which UEs 115 (e.g., a non-anchor devices, such as a vehicle not coupled with an accurate positioning system) compute their respective locations in a distributed manner. In some aspects, the messaging may include location information computed using sidelink-assisted (SL-a) positioning in which UEs 115 (e.g., anchor devices, such as RSUs) or location servers compute the locations of vehicles on behalf of the vehicles.

In an example, post-positioning reference signal messaging between an RSU (e.g., an anchor device) and a vehicle (e.g., a non-anchor device, for cases where the vehicle is not coupled with an accurate positioning system) may include temporal information (e.g., time of arrival, time of departure) associated with positioning reference signals exchanged between the RSU and the vehicle. In some cases, for SL-b positioning, the post-positioning reference signal messaging from the RSU to the vehicle may include a time of departure (from the RSU) for an RSU positioning reference signal and a time of arrival (at the RSU) for a vehicle positioning reference signal. In some cases, for SL-b positioning, the post-positioning reference signal messaging (e.g., from the RSU to the vehicle, from the vehicle to the RSU) may include any combination of location or position information of the RSU and the vehicle, measured clock error noise standard deviation, and clock drift standard deviation. For SL-a positioning, the post-positioning reference signal messaging from the vehicle to the RSU may include a time of arrival (at the vehicle) for an RSU positioning reference signal and a time of departure (from the vehicle) for a vehicle positioning reference signal. In some aspects, for SL-a positioning, the post-positioning reference signal messaging (e.g., from the RSU to the vehicle, from the vehicle to the RSU) may include any combination of location or position information of the RSU and the vehicle, measured clock error noise standard deviation, vehicle speed, and clock drift standard deviation. Examples of aspects of post-positioning reference signal messaging are described with reference to FIG. 3 through FIG. 5.

According to examples of aspects described herein, a UE 115 (e.g., a non-anchor device) may receive a directional positioning reference signal from another UE 115 (e.g., an anchor device or another non-anchor device) over one or more beams. The UE 115 (e.g., non-anchor device) may transmit, and the other UE 115 (e.g., anchor device or other non-anchor device) may receive, a broadcast positioning reference signal in response to receipt of the directional positioning reference signal. The UE 115 (e.g., non-anchor device) may receive, from the other UE 115 (e.g., anchor device or other non-anchor device), a report including timing and directionality associated with transmission of the directional positioning reference signal. The report may also include timing and directionality associated with receipt of the broadcast positioning reference signal at the other UE 115 (e.g., anchor device or other non-anchor device).

The UE 115 (e.g., non-anchor device) may determine a reference signal received power value for each beam of the one or more beams based on receipt of the directional positioning reference signal over each of the one or more beams. In some aspects, the UE 115 may assign a rank to each of the one or more beams based on the reference signal received power values determined for the one or more beams. In some examples, responsive to receipt of the report, the UE 115 (e.g., non-anchor device) may transmit beam specific measurement information (e.g., reference signal received power values, beam rankings based on the reference signal received power values) associated with the one or more beams to the other UE 115 (e.g., anchor device or other non-anchor device). The UE 115 (e.g., non-anchor device) may communicate with the other UE 115 (e.g., anchor device or other non-anchor device) using a beam of the one or more beams based on the report and the beam specific measurement information. One or more of the UEs 115 may include a UE communications manager 101, which may perform any of the features of the UE 115 (e.g., non-anchor device) or the other UE 115 (e.g., anchor device or other non-anchor device) as described herein.

Figure 2A:
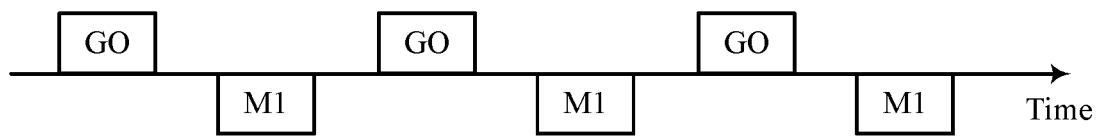
FIGS. 2A and 2B illustrate examples of group listen before talk (LBT) procedures in some systems in accordance with aspects of the present disclosure.
Figure 2B:
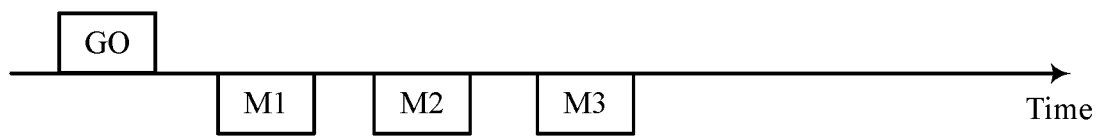

FIGS. 2A and 2B illustrate examples of group listen before talk (LBT) procedures 200 and 201 in some systems. In some examples, the group LBT procedures 200 and 201 may be implemented by aspects of wireless communication system 100. For example, the group LBT procedures 200 and 201 may be implemented by a group of UEs 115 (e.g., a group owner UE 115, one or more member UEs 115) described with reference to FIG. 1. The group LBT procedures 200 and 201 represent examples of channel utilization (e.g., with respect to time) for a single member case and a multiple member case.

A group owner UE 115 may reserve a channel for a duration (e.g., reserve a CoT) for member UEs 115 in the group of UEs 115. In an example, the group of UEs 115 may include the group owner UE 115 and a single member UE 115. In another example, the group of UEs 115 may include the group owner UE 115 and multiple member UEs 115. Referring to the group LBT procedures 200 and 201, GO may represent an LBT procedure by the group owner UE 115, and M1 through M3 may represent respective LBT procedures by member UEs 115. In some other aspects, M1 through M3 may represent the number (e.g., quantity) of distinct beams in the group LBT procedure 201. The group owner UE 115 may perform a category 4 (CAT 4) LBT procedure (e.g., LBT with random back off with a variable size contention window). The member UEs 115 may each perform a category 2 (CAT 2) LBT procedure (e.g., LBT without random back off).

Figure 3A:
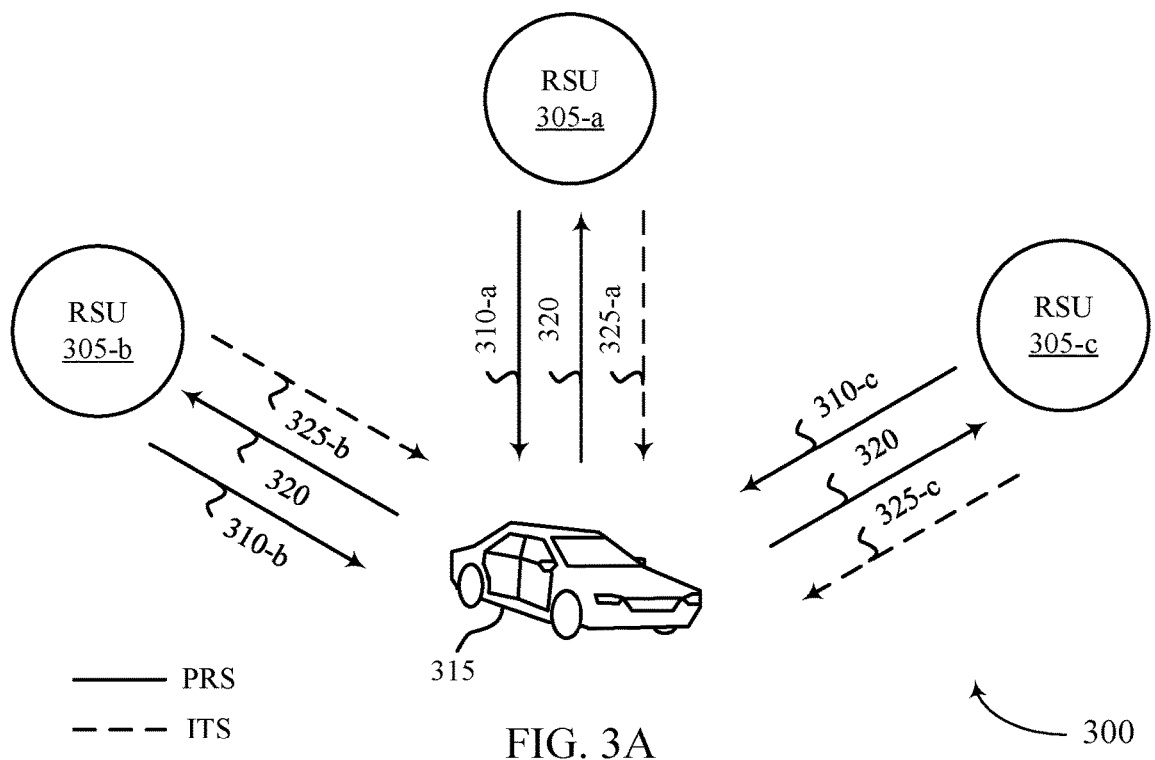
FIGS. 3A and 3B illustrate an example wireless communications system and a signaling timeline described with reference to RTT-based sidelink positioning in some systems in accordance with aspects of the present disclosure.
Figure 3B:
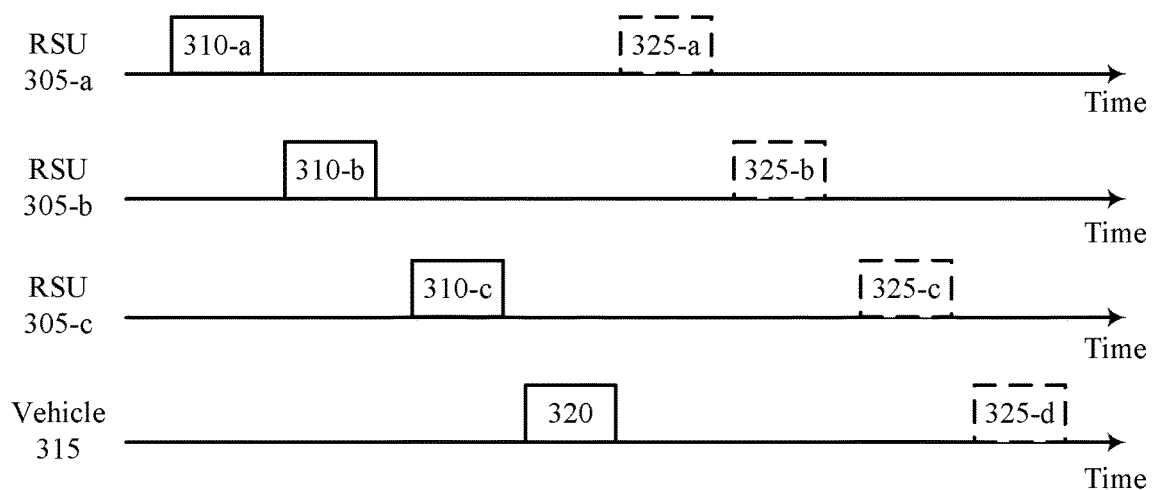

FIGS. 3A and 3B illustrate an example wireless communications system 300 and a signaling timeline 301 described with reference to RTT-based sidelink positioning (e.g., SL-b and SL-a positioning) in some systems. In some examples, the example wireless communications system 300 may implement aspects of wireless communication system 100. The example signal timeline 301 may be implemented by aspects of wireless communication system 100.

In some examples, wireless communications system 300 may include a group of devices including RSU 305-a, RSU 305-b, RSU 305-c, and vehicle 315. RSU 305-a through RSU 305-c may include example aspects of RSUs (e.g., an anchor device) and UEs 115 (e.g., anchor devices) described with reference to FIG. 1. The vehicle 315 may include example aspects of vehicles (e.g., non-anchor devices) and UEs 115 (e.g., non-anchor devices) described with reference to FIG. 1. In some cases, the RSU 305-a through RSU 305-c and vehicle 315 may communicate with each other (e.g., within a V2X system, a D2D system, and the like) and using peer-to-peer communications (e.g., D2D communications such as sidelink communications).

Referring to FIG. 3A, the vehicle 315 may determine the location of the vehicle 315 based on position information of RSU 305-a through RSU 305-c. For example, RSU 305-a through RSU 305-c and vehicle 315 may be grouped together (e.g., phase 1) for performing group LBT procedures. In an example, RSU 305-a through RSU 305-c and vehicle 315 may perform group LBT procedures (e.g., phase 2) as described with reference to FIG. 1 and FIG. 2. For example, RSU 305-a may initiate group LBT procedures, reserving a quantity of time slots for positioning reference signal transmissions for RSU 305-a and all other members in the same group as RSU 305-a (e.g., RSU 305-b, RSU 305-c, vehicle 315).

The group members may broadcast respective positioning reference signals during the time slots. For example, RSU 305-a through RSU 305-c may transmit (e.g., broadcast) positioning reference signal 310-a through positioning reference signal 310-c, respectively. Positioning reference signal 310-a through positioning reference signal 310-c may be received at vehicle 315 and other vehicles 315. In some aspects, RSU 305-a through RSU 305-c may transmit (e.g., broadcast) positioning reference signal 310-a through positioning reference signal 310-c sequentially, as indicated at signaling timeline 301. Vehicle 315 may transmit (e.g., broadcast) positioning reference signal 320 sequentially with respect to positioning reference signal 310-a through positioning reference signal 310-c (e.g., after positioning reference signal 310-c), as indicated at signaling timeline 301.

RSU 305-a through RSU 305-c may perform ITS message exchanges (e.g., post-positioning reference signal messaging) with vehicle 315 based on the positioning reference signal 310-a through positioning reference signal 310-c and the positioning reference signal 320. In an example of SL-b positioning, RSU 305-a through RSU 305-c may respectively transmit (e.g., broadcast), and the vehicle 315 may receive, ITS message 325-a through ITS message 325-c. Each ITS message 325 (e.g., ITS message 325-a through ITS message 325-c) may include measurement information with respect to positioning reference signals, such as a time of departure for a positioning reference signal broadcast by respective RSU 305 (e.g., RSU 305-a through RSU 305-c). In some examples, the measurement information in each ITS message 325 (e.g., ITS message 325-a through ITS message 325-c) may also include a time of arrival for a positioning reference signal 320 received by the respective RSU 305 (e.g., RSU 305-a through RSU 305-c) from vehicle 315. For example, ITS message 325-a may include a time of departure for positioning reference signal 310-a as broadcast by RSU 305-a and a time of arrival for positioning reference signal 320 as received by RSU 305-a.

Based on the measurement information included in the ITS messages 325 (e.g., ITS message 325-a through ITS message 325-c), vehicle 315 may calculate or estimate location or position information of vehicle 315. In some aspects, vehicle 315 may calculate or estimate clock error at vehicle 315 based on the measurement information. Examples of the ITS messages 325 (e.g., ITS message 325-a through ITS message 325-c) and the calculation of location or position information of vehicle 315 are described with reference to FIG. 4.

In an example of SL-a positioning (not shown in FIGS. 3A and 3B), the vehicle 315 may transmit (e.g., broadcast) an ITS message which may be received by any of RSU 305-a through RSU 305-c. The ITS message may include measurement information with respect to positioning reference signals, such as a time of departure for the positioning reference signal 320 transmitted by vehicle 315. In some examples, the measurement information in the ITS message may also include a time of arrival for a positioning reference signals 310 (e.g., any of positioning reference signal 310-a through positioning reference signal 310-c) as received by vehicle 315 from a corresponding RSU 305 (e.g., RSU 305-a through RSU 305-c).

Based on the measurement information included in the ITS message, an RSU 305 (e.g., any of RSU 305-a through RSU 305-c) may calculate or estimate location or position information of the RSU 305. In some aspects, the RSU 305 may calculate or estimate clock error at the RSU 305 based on the measurement information. Examples of the ITS message transmitted (e.g., broadcast) by vehicle 315 and the calculation of location or position information of the RSU 305 are described with reference to FIG. 4.

Figure 4:
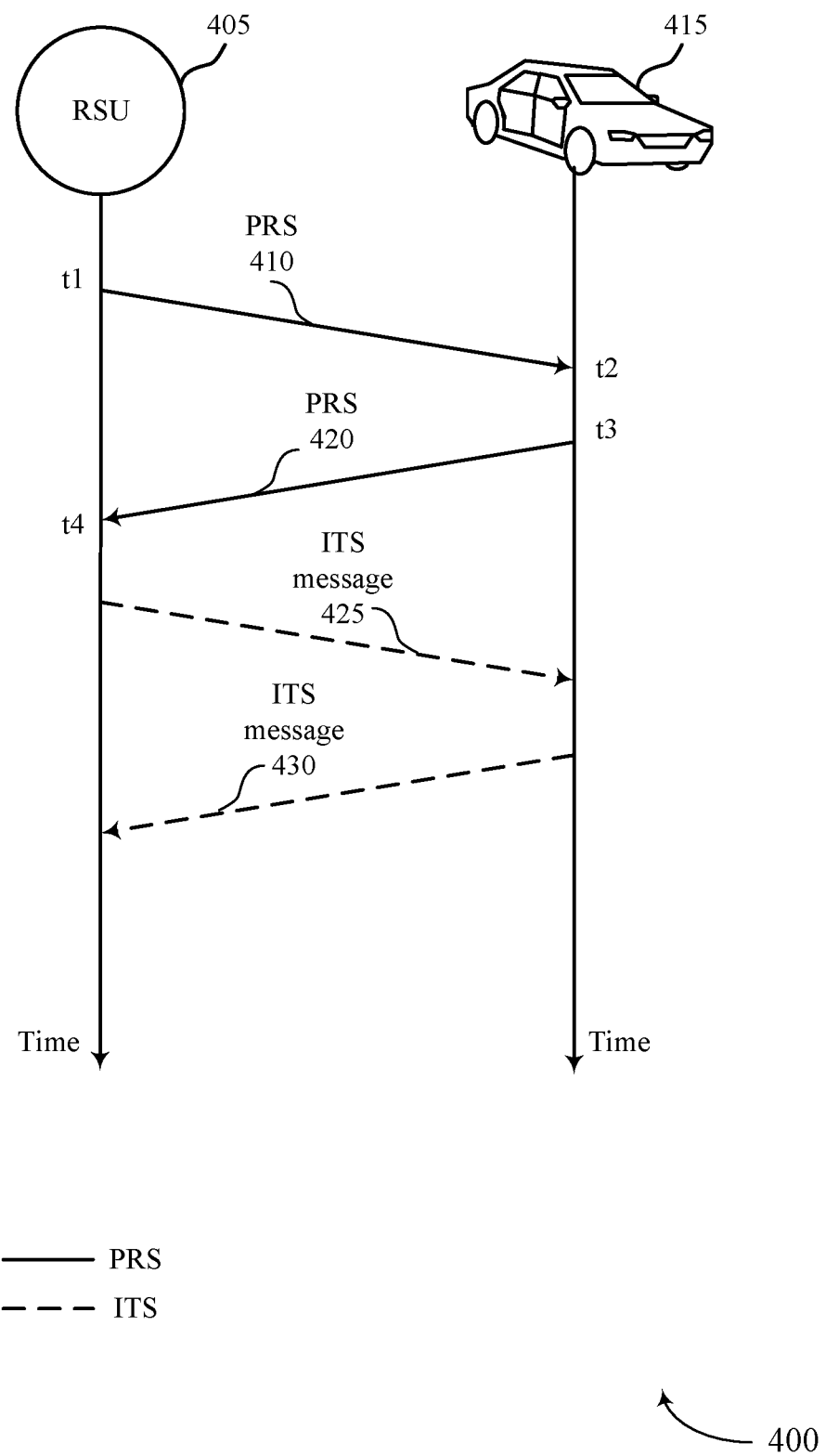
FIG. 4 illustrates an example of a process flow with reference to RTT-based sidelink positioning in some systems in accordance with aspects of the present disclosure.

FIG. 4 illustrates an example of a process flow 400 (with respect to time) between an RSU 405 and a vehicle 415 that supports RTT-based sidelink positioning (e.g., SL-b or SL-a positioning) in some systems. RSU 405 and vehicle 415 may be examples of RSU 305 (e.g., any of RSU 305-a through RSU 305-c) and vehicle 315 of FIG. 3. In some examples, the process flow 400 may be implemented by aspects of wireless communication system 100 or 300 and signaling timeline 301 described with reference to FIG. 1 and FIG. 3. RSU 405 may transmit (e.g., broadcast) a positioning reference signal 410 at time point t1, which vehicle 415 may receive at time point t2. Vehicle 415 may transmit (e.g., broadcast) a positioning reference signal 420 at time point t3, which RSU 405 may receive at time point t4. The positioning reference signal 410 and the positioning reference signal 420 may respectively include examples of aspects of a positioning reference signal 310 (e.g., positioning reference signal 310-a) and the positioning reference signal 320 described with reference to FIGS. 3A and 3B.

In an example of SL-b positioning, RSU 405 may transmit (e.g., broadcast), and the vehicle 415 may receive, ITS message 425. The ITS message 325 may include measurement information with respect to positioning reference signals, such as a time of departure (e.g., a time point t1) for the positioning reference signal 410 broadcast by RSU 405. In some examples, the measurement information in the ITS message 425 may also include a time of arrival (e.g., time point t4) for the positioning reference signal 420 received by the RSU 405 from vehicle 415. In some aspects, the time of departure for the positioning reference signal 410 may be equal t1' (e.g., based on a local clock of RSU 405, such that t1' may or may not be the same as time point t1). In some aspects, the time of arrival for the positioning reference signal 420 may be equal t4' (e.g., based on the local clock of RSU 405, such that t4' may or may not be the same as time point t4).

Based on the measurement information included in the ITS message 425, vehicle 415 may calculate or estimate location or position information of vehicle 415. In some aspects, vehicle 415 may calculate or estimate clock error at vehicle 415 based on the measurement information. In some examples, vehicle 415 may calculate location or position information of the vehicle 415 using a Kalman filter (or any other techniques). For example, the vehicle 415 may calculate location or position information of the vehicle 415 using a time-series based approach.

In an example aspect, vehicle 415 may calculate location or position information using an equation incorporating the time points t1 through t4. For example, vehicle 415 may calculate location or position information $Z_n$ of the vehicle 415 using equation 1:

$$z_n = (t_4 - t_3) + (t_2 - t_1) = \frac{\|r - x(t_n)\|}{v_{light}} + \alpha \quad (1)$$

where α is a constant aspect of the clock error at vehicle 415, where the clock error may be equal to a difference between a clock time (e.g., time point) associated with transmitting a signal from vehicle 415 and a clock time (e.g., time point) associated with receiving the same signal at RSU 405. In equation 1, r may correspond to a location of RSU 405, vlight may be equal to the speed of light, and x(tn) may correspond to the location of vehicle 415 at time tn.

In an example of SL-a positioning, the vehicle 415 may transmit (e.g., broadcast) an ITS message 430 which may be received by RSU 405. The ITS message 430 may include measurement information with respect to positioning reference signals, such as a time of departure t3 for the positioning reference signal 420 transmitted by vehicle 415. In some examples, the measurement information in the ITS message 430 may also include a time of arrival for positioning reference signal 410 as received by vehicle 415 from RSU 405. In some aspects, the time of departure for the positioning reference signal 420 may be equal t3' (e.g., based on a local clock of vehicle 415, such that t3' may or may not be the same as time point t3). In some aspects, the time of arrival for the positioning reference signal 410 may be equal t2' (e.g., based on the local clock of vehicle 415, such that t2' may or may not be the same as time point t2).

Based on the measurement information included in the ITS message, an RSU 405 may calculate or estimate location or position information of the RSU 405. In some aspects, the RSU 405 may calculate or estimate clock error at the RSU 405 based on the measurement information. In some examples, RSU 405 may calculate location or position information of the RSU 405 using a Kalman filter (or any other available technique). For example, the RSU 405 may calculate location or position information of the RSU 405 using a time-series based approach. In an example aspect, RSU 405 may calculate location or position information using an equation incorporating the time points t1 through t4. For example, RSU 405 may calculate location or position information $Z_n$ of the RSU 405 using equation 1.

The example aspects described between an RSU and a vehicle with reference to FIGS. 3A and 3B and FIG. 4 may be applied to a location server and a vehicle. For example, positioning reference signals may be exchanged between a server-Location Client Function (S-LCF) and vehicle 415 and for estimating location or position information (or clock error) of the S-LCF or vehicle 415 using the example techniques described herein.

Aspects of FIGS. 3A, 3B and 4 are described with reference to exchanging positioning reference signals in some systems using an unlicensed frequency band. However, in the mmW bands, penetration or coverage of transmitted positioning reference signals may be constrained due to narrow beam widths and interfering objects. In some cases, when positioning reference signals are broadcast directionally over different beams (e.g., exploiting beam patterns available to a transmitting device), the positioning reference signals may be differently impacted due to different channel realizations (e.g., channel quality, channel occupancy) associated with the beams. Accordingly, in some cases, using SL-b or SL-a positioning techniques applicable to unlicensed bands (e.g., for group LBT procedures and group positioning reference signal transmissions) may be unreliable and have increased latency when applied to mmW bands.

For example, in cases of omni-directional LBT techniques in the mmW bands, carrier sensing may omnidirectional. In some cases, omnidirectional carrier sensing may be robust to hidden node problems, but at the tradeoff of reduced spatial reuse (e.g., overprotective). In some examples, in cases of directional LBT techniques in the mmW bands, LBT carrier sensing may be directional. In some cases, directional LBT carrier sensing may have increased spatial reuse, but at the tradeoff of being less robust to hidden node problems (e.g., less protective). At the 5 GHz and 60 GHz frequency bands in the unlicensed spectrum, group LBT may be implemented by sharing CoT, and positioning reference signals in the mmW bands may or may not be located in these frequency bands. Additionally, based on frequency specifications or region specific regulations, a combination of omni-directional LBT techniques and directional LBT techniques may be implemented for mmWAVE transmissions Aspects of the techniques described herein may include applying distributed mmW positioning (e.g., based on SL-b positioning) to transmitting positioning reference signals using the mmW bands, examples of which are described with reference to FIG. 5.

Figure 5:
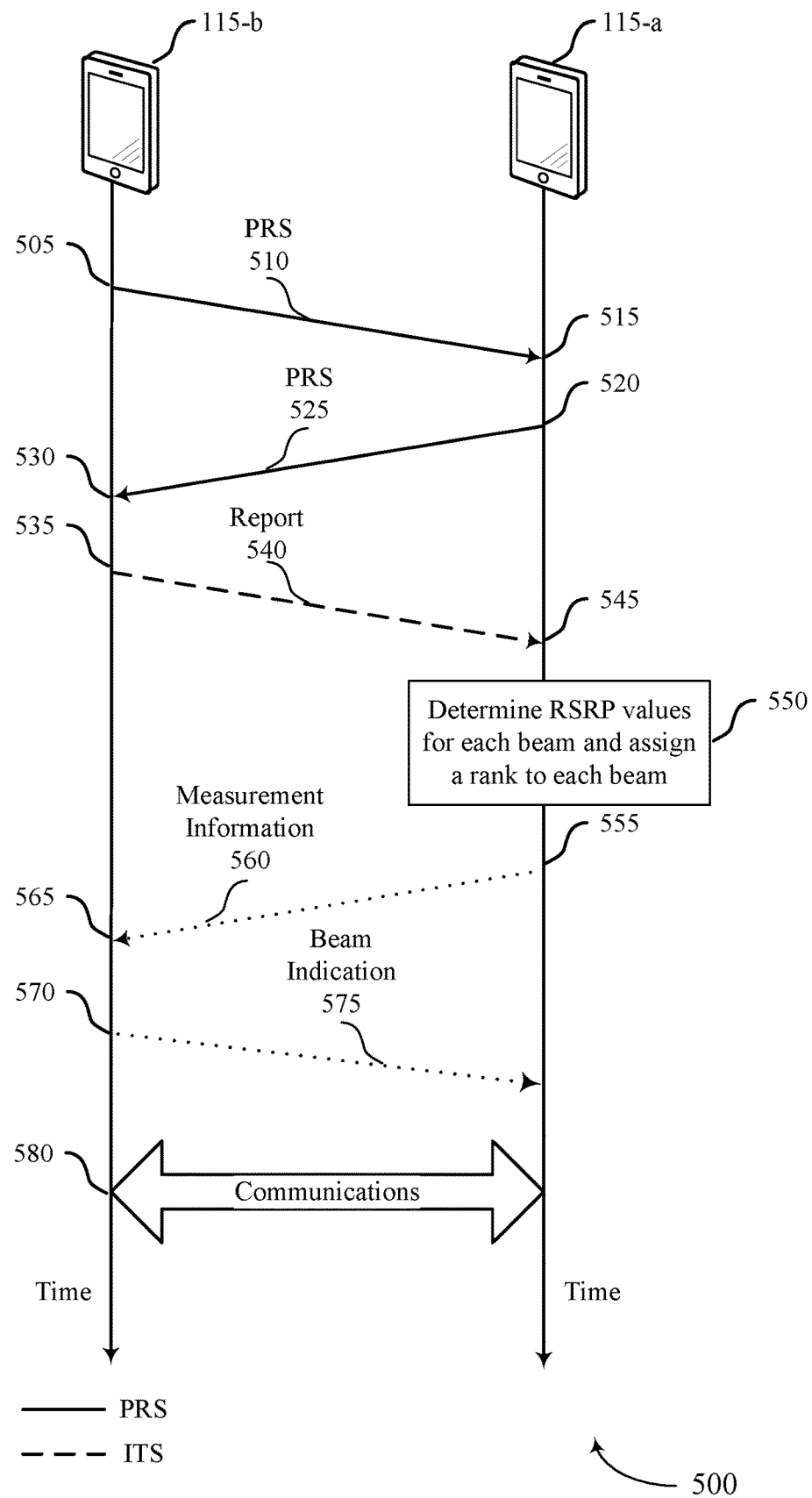
FIG. 5 illustrates an example of a process flow that supports bidirectional positioning reference signal measurement exchange in mmW-based RTT positioning in accordance with aspects of the present disclosure.

FIG. 5 illustrates an example of a process flow 500 that supports bidirectional positioning reference signal measurement exchange in mmW-based RTT positioning in accordance with aspects of the present disclosure. In some examples, process flow 500 may implement aspects of wireless communication system 100, wireless communications system 300, signaling timeline 301, and process flow 400.

Process flow 500 may be implemented by a UE 115-a and a UE 115-b, which may be examples of a UE 115 described with reference to FIG. 1. UE 115-a may be a non-anchor device. For example, UE 115-a may include example aspects of vehicle 315 or vehicle 415 described with reference to FIGS. 3 and 4. UE 115-b may be an anchor device. For example, UE 115-a may include example aspects of RSU 305-a through RSU 305-c or RSU 405 described with reference to FIGS. 3 and 4. In some aspects, UE 115-b may be a non-anchor device randomly selected to function as an anchor device. In some cases, UE 115-b may be randomly selected by the upper layer. In some cases, UE 115-b may randomly select itself to function as an anchor device. In some aspects, any arbitrary technique associated with random selection (e.g., random selection of a UE out of a total quantity of UEs) may be applied for selecting a non-anchor device to function as an anchor device. In some examples, the selection of a non-anchor device to function as an anchor device may be based on non-anchor to non-anchor positioning.

At 505 (e.g., at a time point t1), UE 115-b may transmit a directional positioning reference signal 510 over a set of beams (e.g., using different beams). In some aspects, UE 115-b may broadcast the directional positioning reference signal 510 using different beams.

At 515 (e.g., at a time point t2), UE 115-a may receive the directional positioning reference signal 510 over one or more beams of the set of beams. In some aspects, UE 115-a may respectively receive multiple positioning reference signals from multiple UEs 115 (e.g., multiple anchor devices such as multiple RSUs, or multiple non-anchor devices).

At 520 (e.g., at a time point t3), UE 115-a may transmit a broadcast positioning reference signal 525 in response to receipt of the directional positioning reference signal 510. In some aspects, UE 115-a may transmit the broadcast positioning reference signal 525 using an omnidirectional beam (e.g., in 64 directions). In some examples, UE 115-a may transmit the broadcast positioning reference signal 525 using an omnidirectional beam as a default configuration.

At 530 (e.g., at a time point t4), UE 115-b may receive, from UE 115-a and in response to receipt of the directional positioning reference signal 510 at the UE 115-a over one or more beams of the set of beams, the broadcast positioning reference signal 525.

At 535, UE 115-b may transmit, to UE 115-a, a report 540 (as shown in the example Table 1 below) including timing and directionality associated with transmission of the directional positioning reference signal 510. The report 540 may include timing and directionality associated with receipt of the broadcast positioning reference signal 525 at UE 115-b. In some aspects, the report 540 may include at least one of a temporal instance (e.g., time of departure) and a direction (e.g., angle of departure, direction of departure) associated with transmission of the directional positioning reference signal 510 over the one or more beams by the UE 115-b. In some aspects, the report 540 may include at least one of a temporal instance (e.g., time of arrival) and a direction (e.g., angle of arrival, direction of arrival) associated with reception of the broadcast positioning reference signal 525 at the UE 115-b.

TABLE 1

|  | Time Departure | Angle Departure | Time of Arrival of UE 115-a PRS | Angle of Arrival for UE 115-b PRS |
|---|---|---|---|---|
| Beam 1 of RSU | x | x | Antenna1: x | Theta |
| Beam 2 of RSU | y | y | Antenna2: y |  |
| Beam 3 of RSU | z | z | Antenna3: z |  |

In some examples, UE 115-b may transmit the report 540 using an ITS message. At 545, UE 115-a may receive the report 540.

At 550, UE 115-a may determine a reference signal received power value for each beam of the one or more beams based on receipt of the directional positioning reference signal 510 over each of the one or more beams. In some aspects, UE 115-a may assign a rank to each of the one or more beams based on the reference signal received power values determined for the one or more beams.

At 555, UE 115-a may transmit beam specific measurement information 560 associated with the one or more beams to UE 115-b, and at 565, UE 115-b may receive the beam specific measurement information 560. In some aspects, the beam specific measurement information 560 may include reference signal received power values and beam rankings based on the reference signal received power values (as shown in the example Table 2 below). With respect to the angles of arrival and angles of departure indicated in the report 540 and the beam specific measurement information 560, UE 115-a and UE 115-b (e.g., non-anchors and anchors) may be subject to initial orientation error (e.g., based on respective sensors or gyroscopes of UE 115-a and UE 115-b) such that the angles of arrival and departure may be have an accuracy level with respect to a factor.

Accordingly, UE 115-a may report beam specific measurement information 560 with respect to different directional positioning reference signal transmissions. In some aspects, the beam specific measurement information 560 may include a set of beam indexes or a beam pattern associated with each beam of the one or more beams. For example, the beam specific measurement information 560 may indicate a beam pattern available to UE 115-a. In some aspects, UE 115-a may transmit the beam specific measurement information 560 using an ITS message.

TABLE 2

|  | Angle Arrival | Time Arrival | RSRP | RSRP Ranking |
|---|---|---|---|---|
| Beam1 of RSU1 | x | x | x | 1 |
| Beam2 of RSU1 | y | y | y | 2 |
| Beam3 of RSU1 | z | z | z | 3 |
| Beam1 of RSU2 | w | w | w | 4 |

In some aspects, UE 115-a may select a beam of the one or more beams for communicating with UE 115-b in a next cycle, based on the reference signal received power values for the one or more beams. By evaluating the beams based on reference signal received power values, UE 115-a may identify potential blockages with respect to beams for communicating with UE 115-b. For example, by first transmitting the broadcast positioning reference signal 525 using an omnidirectional beam (e.g., in 64 directions) at 520, followed by selecting a beam based on the reference signal received power values, UE 115-a may select a beam for successfully broadcasting (e.g., directionally) a positioning reference signal in the next cycle (e.g., avoiding potential blockage of the transmission). Such example techniques may be advantageous over some systems which may broadcast a positioning reference signal directionally at the first stage (e.g., at 520), which could be susceptible to blockage. Additionally, in some aspects, UE 115-a or UE 115-b may reduce the quantity of potential beams for communicating positioning reference signals (e.g., remove beams as candidate beams for transmitting positioning reference signals) based on the reference signal received power values (e.g., based on whether the beams are subject to blockage). For example, UE 115-a or UE 115-b may reduce the quantity of potential beams from 64 beams to 32 beams based on the reference signal received power values.

In some other aspects, at 570, UE 115-b may transmit an indication 575 of a beam for communicating with UE 115-b, based on UE 115-b receiving the beam specific measurement information. For example, UE 115-b may select a beam for UE 115-a to broadcast (e.g., directionally) a positioning reference signal in the next cycle (e.g., to avoid potential blockage of the transmission), and UE 115-b may communicate the beam selection in the indication 575. In some examples, UE 115-b may transmit the indication 575 via an ITS message. In an example, UE-115 b may acknowledge the beam pattern received by UE 115-a, and UE 115-b may determine whether to reduce the set of positioning reference signals or remove a set of positioning reference signals. In some aspects, UE 115-b may transmit the indication 575 using index numbers associated with the reduced set of positioning reference signals. For example, in a case of using the first 32 beams out of 64 possible beams for transmitting positioning reference signals, a payload of the indication 575 may include index 1 to 32.

At 580, UE 115-a may communicate with UE 115-b using the beam of the one or more beams based on the report and the beam specific measurement information.

In the following description of the process flow 500, the operations between UE 115-a and UE 115-b may be in a different order than the order shown or at different times. Certain operations may also be left out of the process flow 500, or other operations may be added to the process flow 500. It is to be understood that while UE 115-a and UE 115-b are shown performing a number of the operations of process flow 500, any wireless device may perform the operations shown.

Figure 6:
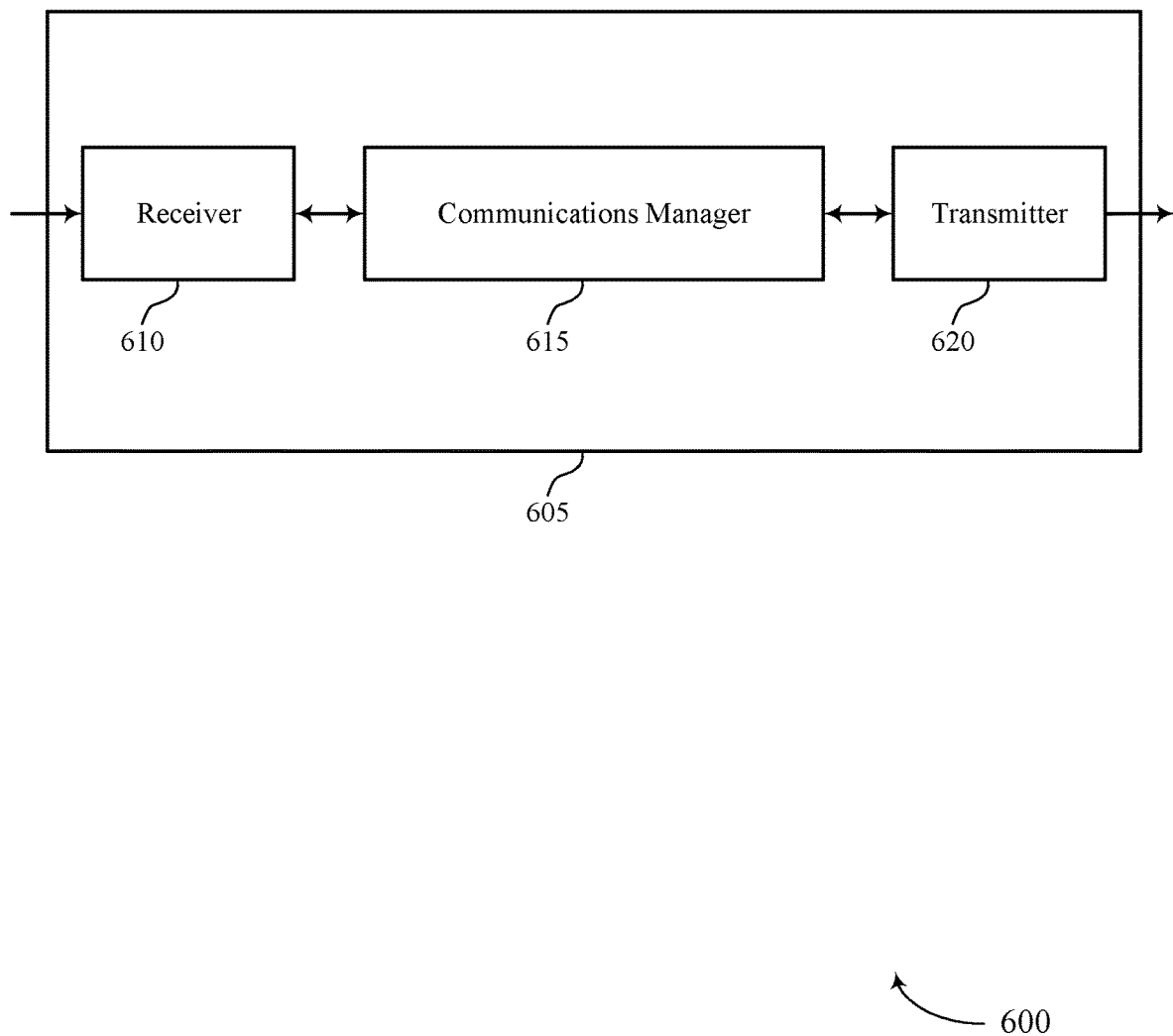
FIGS. 6 and 7 show block diagrams of devices that support bidirectional positioning reference signal measurement exchange in mmW-based RTT positioning in accordance with aspects of the present disclosure.

FIG. 6 shows a block diagram 600 of a device 605 that supports bidirectional positioning reference signal measurement exchange in mmW-based RTT positioning in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to bidirectional positioning reference signal measurement exchange in mmW-based RTT positioning, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a directional positioning reference signal over one or more beams of a set of beams, transmit a broadcast positioning reference signal in response to receipt of the directional positioning reference signal, receive, from a second wireless device, a report including timing and directionality associated with transmission of the directional positioning reference signal and receipt of the broadcast positioning reference signal at the second wireless device, transmit, to the second wireless device and responsive to receipt of the report, beam specific measurement information associated with the one or more beams of the set of beams, and communicate with the second wireless device using a beam of the one or more beams based on the report and the beam specific measurement information.

The communications manager 615 may also transmit a directional positioning reference signal over a set of beams, receive, from a first wireless device and in response to receipt of the directional positioning reference signal at the first wireless device over one or more beams of the set of beams, a broadcast positioning reference signal, transmit, to the first wireless device, a report including timing and directionality associated with transmission of the directional positioning reference signal and receipt of the broadcast positioning reference signal at the second wireless device, receive, from the first wireless device and responsive to receipt of the report at the first wireless device, beam specific measurement information associated with the one or more beams of the set of beams, and communicate with the first wireless device using a beam of the one or more beams based on the report and the beam specific measurement information. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
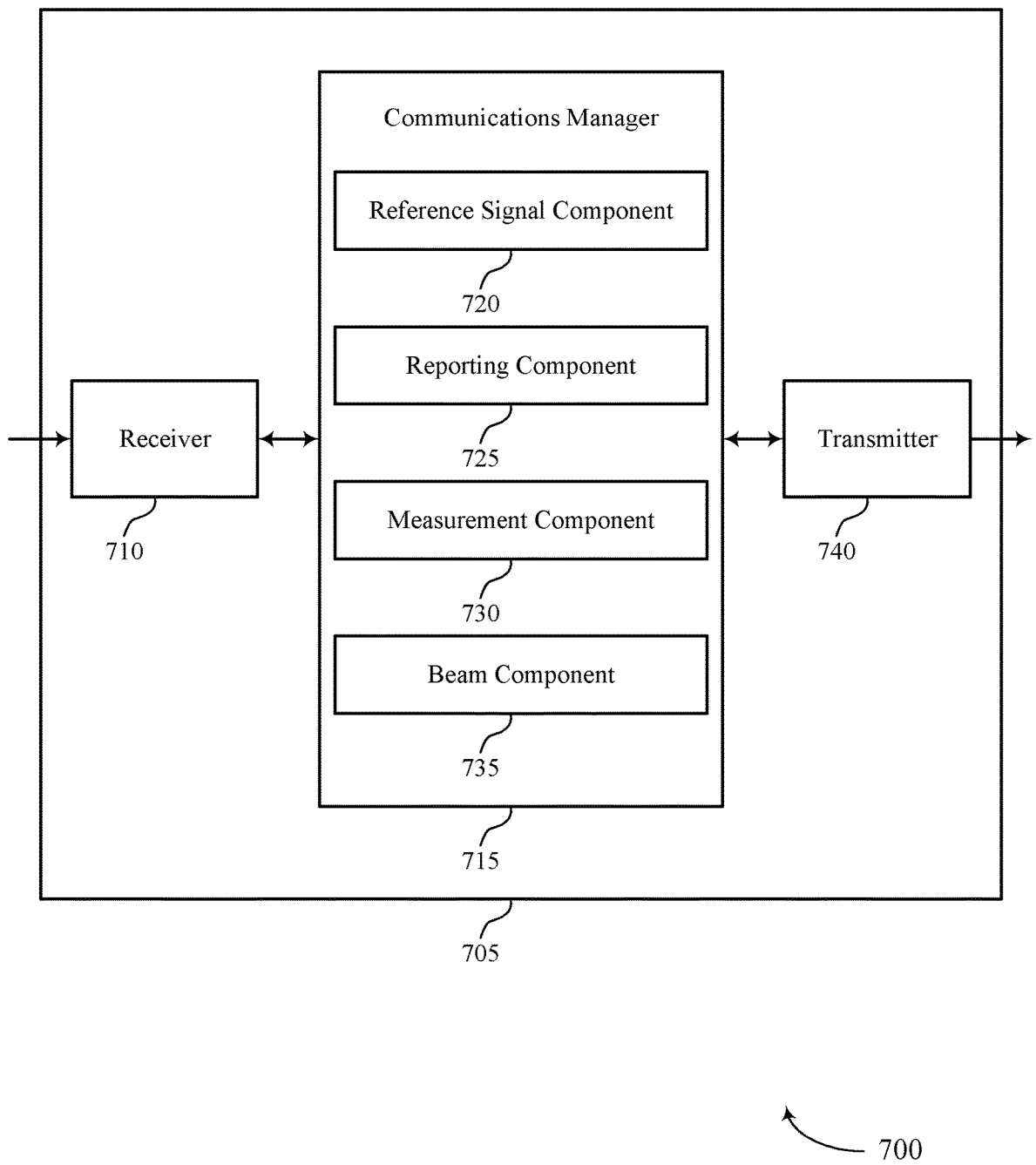

FIG. 7 shows a block diagram 700 of a device 705 that supports bidirectional positioning reference signal measurement exchange in mmW-based RTT positioning in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to bidirectional positioning reference signal measurement exchange in mmW-based RTT positioning, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a reference signal component 720, a reporting component 725, a measurement component 730, and a beam component 735. The communications manager 715 may be an example of aspects of the communications manager 910 described herein.

The reference signal component 720 may receive a directional positioning reference signal over one or more beams of a set of beams and transmit a broadcast positioning reference signal in response to receipt of the directional positioning reference signal. The reporting component 725 may receive, from a second wireless device, a report including timing and directionality associated with transmission of the directional positioning reference signal and receipt of the broadcast positioning reference signal at the second wireless device. The measurement component 730 may transmit, to the second wireless device and responsive to receipt of the report, beam specific measurement information associated with the one or more beams of the set of beams. The beam component 735 may communicate with the second wireless device using a beam of the one or more beams based on the report and the beam specific measurement information.

The reference signal component 720 may transmit a directional positioning reference signal over a set of beams and receive, from a first wireless device and in response to receipt of the directional positioning reference signal at the first wireless device over one or more beams of the set of beams, a broadcast positioning reference signal. The reporting component 725 may transmit, to the first wireless device, a report including timing and directionality associated with transmission of the directional positioning reference signal and receipt of the broadcast positioning reference signal at the second wireless device. The measurement component 730 may receive, from the first wireless device and responsive to receipt of the report at the first wireless device, beam specific measurement information associated with the one or more beams of the set of beams. The beam component 735 may communicate with the first wireless device using a beam of the one or more beams based on the report and the beam specific measurement information.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
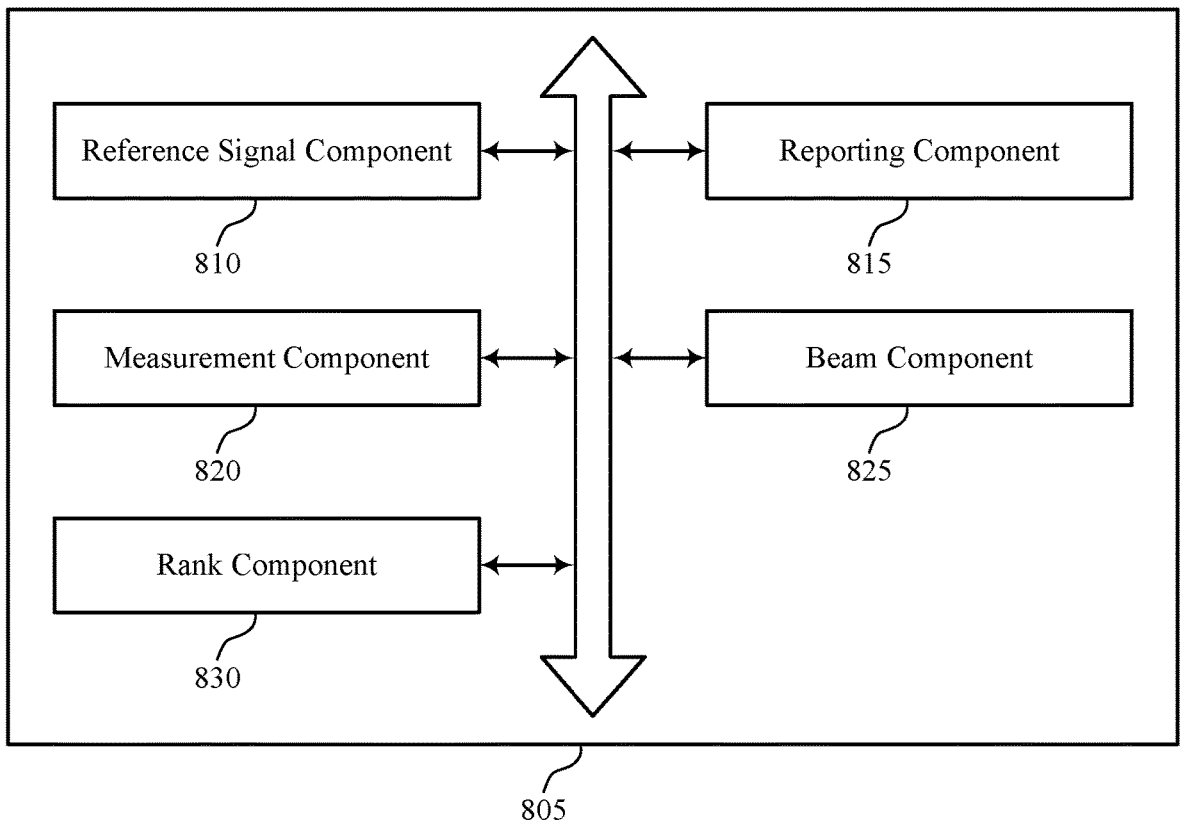
FIG. 8 shows a block diagram of a communications manager that supports bidirectional positioning reference signal measurement exchange in mmW-based RTT positioning in accordance with aspects of the present disclosure.

FIG. 8 shows a block diagram 800 of a communications manager 805 that supports bidirectional positioning reference signal measurement exchange in mmW-based RTT positioning in accordance with aspects of the present disclosure. The communications manager 805 may be an example of aspects of a communications manager 615, a communications manager 715, or a communications manager 910 described herein. The communications manager 805 may include a reference signal component 810, a reporting component 815, a measurement component 820, a beam component 825, and a rank component 830. Each of these modules may communicate, directly or indirectly, with one another (e.g., via one or more buses).

The reference signal component 810 may receive a directional positioning reference signal over one or more beams of a set of beams. In some examples, the reference signal component 810 may transmit a broadcast positioning reference signal in response to receipt of the directional positioning reference signal. In some examples, the reference signal component 810 may transmit a directional positioning reference signal over a set of beams. In some examples, the reference signal component 810 may receive, from a first wireless device and in response to receipt of the directional positioning reference signal at the first wireless device over one or more beams of the set of beams, a broadcast positioning reference signal.

In some cases, the first wireless device includes a non-anchor device in a round RTT positioning scheme. In some cases, the second wireless device includes an anchor device in the RTT positioning scheme. In some cases, the second wireless device includes another non-anchor device in the RTT positioning scheme. In some cases, the second wireless device includes a RSU in a RTT positioning scheme. In some cases, the first wireless device includes a non-anchor device in a RTT positioning scheme. In some cases, the second wireless device includes an anchor device in the RTT positioning scheme. In some cases, the second wireless device includes another non-anchor device in the RTT positioning scheme.

The reporting component 815 may receive, from a second wireless device, a report including timing and directionality associated with transmission of the directional positioning reference signal and receipt of the broadcast positioning reference signal at the second wireless device. In some examples, the reporting component 815 may receive at least one of a temporal instance and a direction associated with transmission of the directional positioning reference signal over the one or more beams by the second wireless device. In some examples, the reporting component 815 may receive at least one of a temporal instance and a direction associated with reception of the broadcast positioning reference signal at the second wireless device. The measurement component 820 may transmit, to the second wireless device and responsive to receipt of the report, beam specific measurement information associated with the one or more beams of the set of beams. In some examples, the measurement component 820 may determine a reference signal received power value for each beam of the one or more beams based on receipt of the directional positioning reference signal over each of the one or more beams.

In some examples, the measurement component 820 may transmit at least one of a temporal instance and a direction associated with receipt of the directional positioning reference signal over the one or more beams. The beam component 825 may communicate with the second wireless device using a beam of the one or more beams based on the report and the beam specific measurement information. In some examples, the beam component 825 may select the beam of the one or more beams based on reference signal received power values for the one or more beams. In some examples, the beam component 825 may receive an indication of the beam of the one or more beams based on transmitting the beam specific measurement information. The rank component 830 may assign a rank to each of the one or more beams based on the reference signal received power values determined for the one or more beams. In some examples, transmitting the beam specific measurement information includes transmitting at least one of the determined reference signal received power values and the assigned ranks for the one or more beams. In some examples, transmitting the beam specific measurement information includes transmitting at least one of a set of beam indexes and a beam pattern associated with each beam of the one or more beams.

In some examples, the reporting component 815 may transmit, to the first wireless device, a report including timing and directionality associated with transmission of the directional positioning reference signal and receipt of the broadcast positioning reference signal at the second wireless device. In some examples, the reporting component 815 may transmit at least one of a temporal instance and a direction associated with transmitting the directional positioning reference signal over the one or more beams. In some examples, the reporting component 815 may transmit at least one of a temporal instance and a direction associated with reception of the broadcast positioning reference signal at the second wireless device. In some examples, the measurement component 820 may receive, from the first wireless device and responsive to receipt of the report at the first wireless device, beam specific measurement information associated with the one or more beams of the set of beams.

In some examples, receiving the beam specific measurement information includes receiving at least one of a set of beam indexes and a beam pattern associated with each beam of the one or more beams. In some cases, the report includes a reference signal received power value for each beam of the one or more beams associated with the directional positioning reference signal. In some cases, the report includes at least one of a temporal instance and a direction associated with the directional positioning reference signal as received over the one or more beams by the first wireless device. In some cases, the report includes a rank associated with each beam of the one or more beams with respect to at least the reference signal received power values. In some examples, the beam component 825 may communicate with the first wireless device using a beam of the one or more beams based on the report and the beam specific measurement information. In some examples, the beam component 825 may transmit an indication of the beam of the one or more beams based on receiving the beam specific measurement information.

Figure 9:
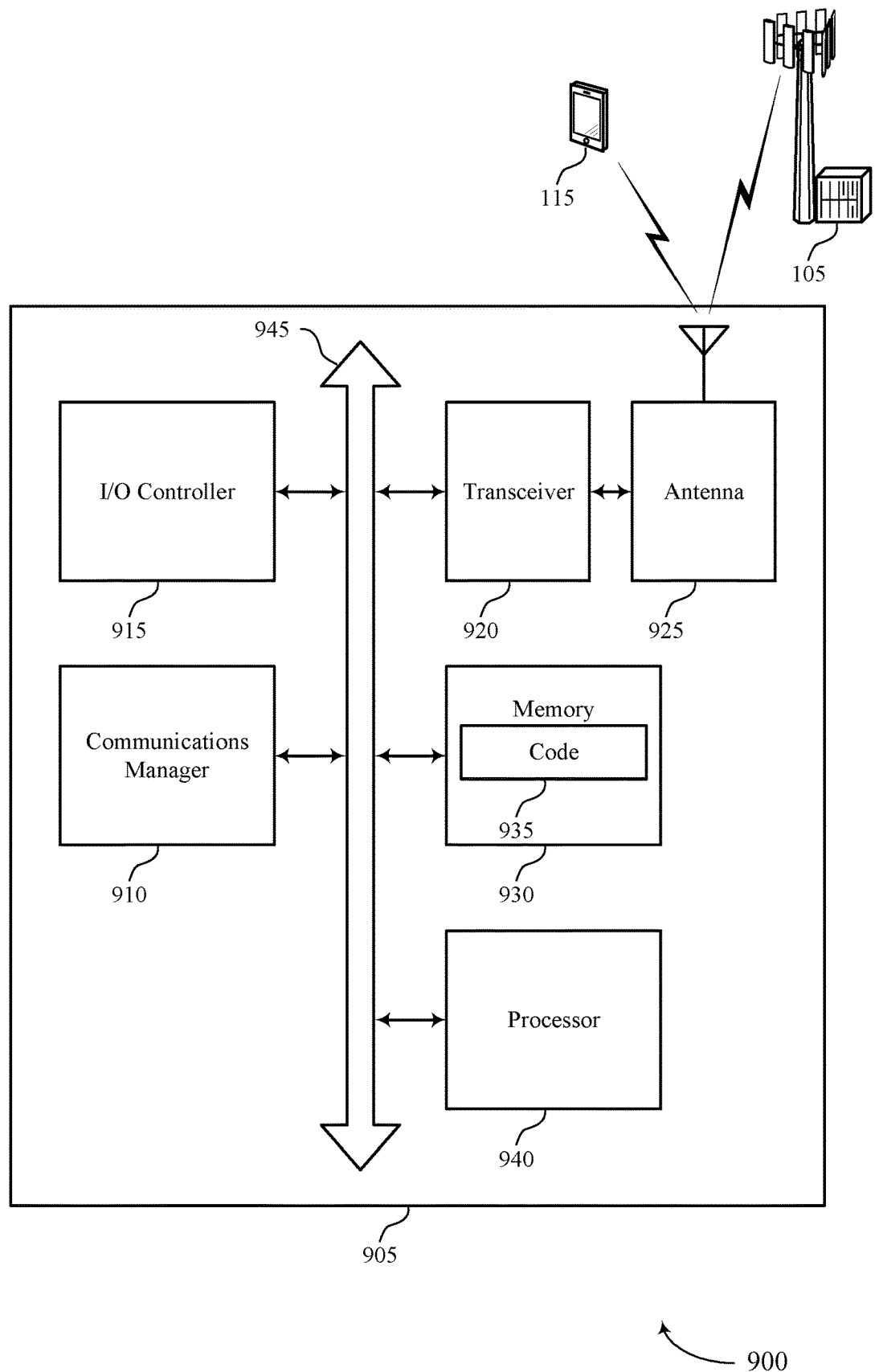
FIG. 9 shows a diagram of a system including a device that supports bidirectional positioning reference signal measurement exchange in mmW-based RTT positioning in accordance with aspects of the present disclosure.

FIG. 9 shows a diagram of a system 900 including a device 905 that supports bidirectional positioning reference signal measurement exchange in mmW-based RTT positioning in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a directional positioning reference signal over one or more beams of a set of beams, transmit a broadcast positioning reference signal in response to receipt of the directional positioning reference signal, receive, from a second wireless device, a report including timing and directionality associated with transmission of the directional positioning reference signal and receipt of the broadcast positioning reference signal at the second wireless device, transmit, to the second wireless device and responsive to receipt of the report, beam specific measurement information associated with the one or more beams of the set of beams, and communicate with the second wireless device using a beam of the one or more beams based on the report and the beam specific measurement information.

The communications manager 910 may also transmit a directional positioning reference signal over a set of beams, receive, from a first wireless device and in response to receipt of the directional positioning reference signal at the first wireless device over one or more beams of the set of beams, a broadcast positioning reference signal, transmit, to the first wireless device, a report including timing and directionality associated with transmission of the directional positioning reference signal and receipt of the broadcast positioning reference signal at the second wireless device, receive, from the first wireless device and responsive to receipt of the report at the first wireless device, beam specific measurement information associated with the one or more beams of the set of beams, and communicate with the first wireless device using a beam of the one or more beams based on the report and the beam specific measurement information.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting bidirectional positioning reference signal measurement exchange in mmW-based RTT positioning).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
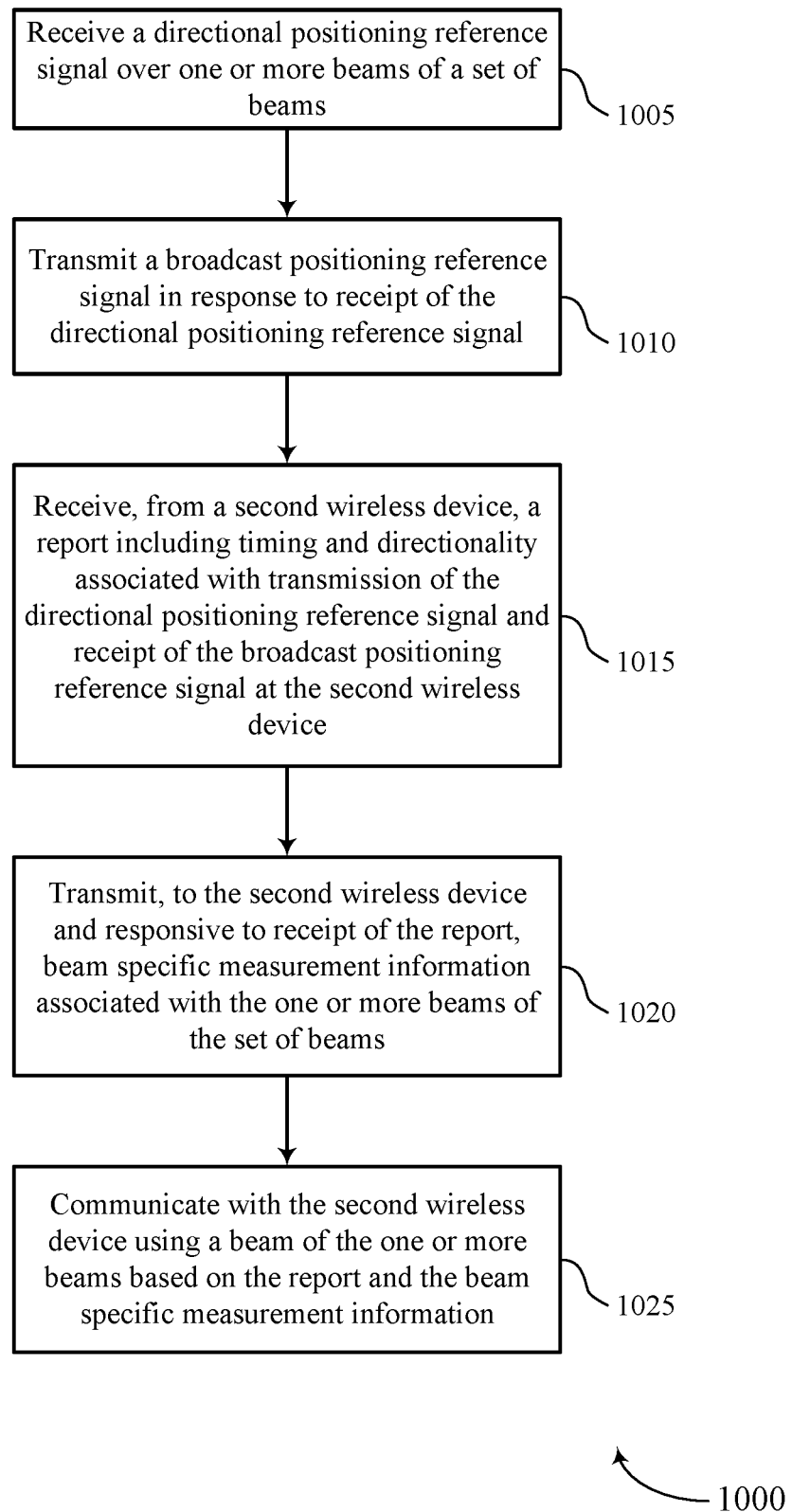
FIGS. 10 through 13 show flowcharts illustrating methods that support bidirectional positioning reference signal measurement exchange in mmW-based RTT positioning in accordance with aspects of the present disclosure.

FIG. 10 shows a flowchart illustrating a method 1000 that supports bidirectional positioning reference signal measurement exchange in mmW-based RTT positioning in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may receive a directional positioning reference signal over one or more beams of a set of beams. The operations of 1005 may be performed according to the methods described herein. In some examples, aspects of the operations of 1005 may be performed by a reference signal component as described with reference to FIGS. 6 through 9.

At 1010, the UE may transmit a broadcast positioning reference signal in response to receipt of the directional positioning reference signal. The operations of 1010 may be performed according to the methods described herein. In some examples, aspects of the operations of 1010 may be performed by a reference signal component as described with reference to FIGS. 6 through 9.

At 1015, the UE may receive, from a second wireless device, a report including timing and directionality associated with transmission of the directional positioning reference signal and receipt of the broadcast positioning reference signal at the second wireless device. The operations of 1015 may be performed according to the methods described herein. In some examples, aspects of the operations of 1015 may be performed by a reporting component as described with reference to FIGS. 6 through 9.

At 1020, the UE may transmit, to the second wireless device and responsive to receipt of the report, beam specific measurement information associated with the one or more beams of the set of beams. The operations of 1020 may be performed according to the methods described herein. In some examples, aspects of the operations of 1020 may be performed by a measurement component as described with reference to FIGS. 6 through 9.

At 1025, the UE may communicate with the second wireless device using a beam of the one or more beams based on the report and the beam specific measurement information. The operations of 1025 may be performed according to the methods described herein. In some examples, aspects of the operations of 1025 may be performed by a beam component as described with reference to FIGS. 6 through 9.

Figure 11:
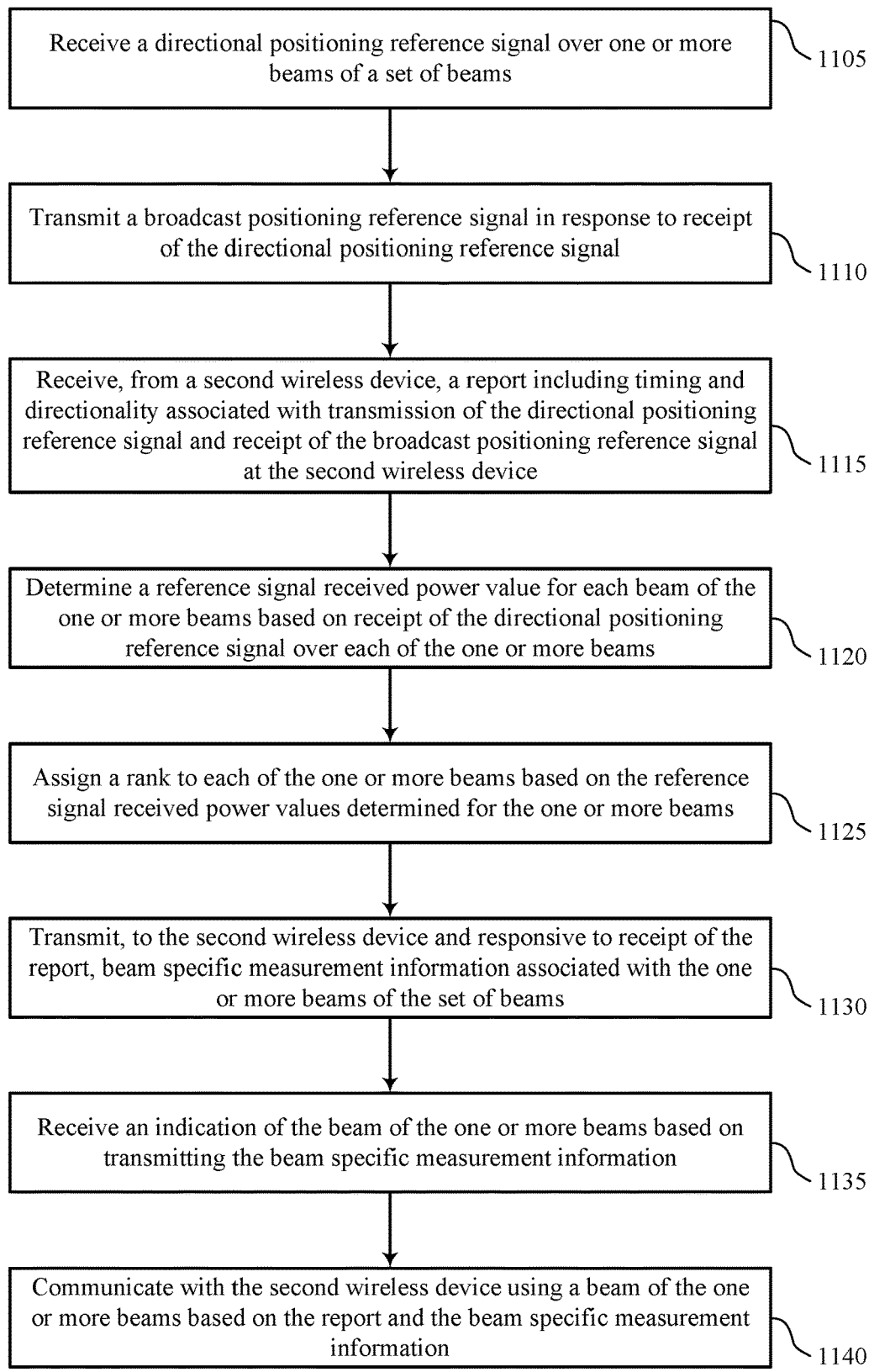

FIG. 11 shows a flowchart illustrating a method 1100 that supports bidirectional positioning reference signal measurement exchange in mmW-based RTT positioning in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may receive a directional positioning reference signal over one or more beams of a set of beams. The operations of 1105 may be performed according to the methods described herein. In some examples, aspects of the operations of 1105 may be performed by a reference signal component as described with reference to FIGS. 6 through 9.

At 1110, the UE may transmit a broadcast positioning reference signal in response to receipt of the directional positioning reference signal. The operations of 1110 may be performed according to the methods described herein. In some examples, aspects of the operations of 1110 may be performed by a reference signal component as described with reference to FIGS. 6 through 9.

At 1115, the UE may receive, from a second wireless device, a report including timing and directionality associated with transmission of the directional positioning reference signal and receipt of the broadcast positioning reference signal at the second wireless device. The operations of 1115 may be performed according to the methods described herein. In some examples, aspects of the operations of 1115 may be performed by a reporting component as described with reference to FIGS. 6 through 9.

At 1120, the UE may determine a reference signal received power value for each beam of the one or more beams based on receipt of the directional positioning reference signal over each of the one or more beams. The operations of 1120 may be performed according to the methods described herein. In some examples, aspects of the operations of 1120 may be performed by a measurement component as described with reference to FIGS. 6 through 9.

At 1125, the UE may assign a rank to each of the one or more beams based on the reference signal received power values determined for the one or more beams. The operations of 1125 may be performed according to the methods described herein. In some examples, aspects of the operations of 1125 may be performed by a rank component as described with reference to FIGS. 6 through 9.

At 1130, the UE may transmit, to the second wireless device and responsive to receipt of the report, beam specific measurement information associated with the one or more beams of the set of beams. The beam specific measurement information may include at least one of the determined reference signal received power values and the assigned ranks for the one or more beams. The operations of 1130 may be performed according to the methods described herein. In some examples, aspects of the operations of 1130 may be performed by a measurement component as described with reference to FIGS. 6 through 9.

At 1135, the UE may receive an indication of the beam of the one or more beams based on transmitting the beam specific measurement information. The operations of 1135 may be performed according to the methods described herein. In some examples, aspects of the operations of 1135 may be performed by a beam component as described with reference to FIGS. 6 through 9.

At 1140, the UE may communicate with the second wireless device using a beam of the one or more beams based on the report and the beam specific measurement information. The operations of 1140 may be performed according to the methods described herein. In some examples, aspects of the operations of 1140 may be performed by a beam component as described with reference to FIGS. 6 through 9.

Figure 12:
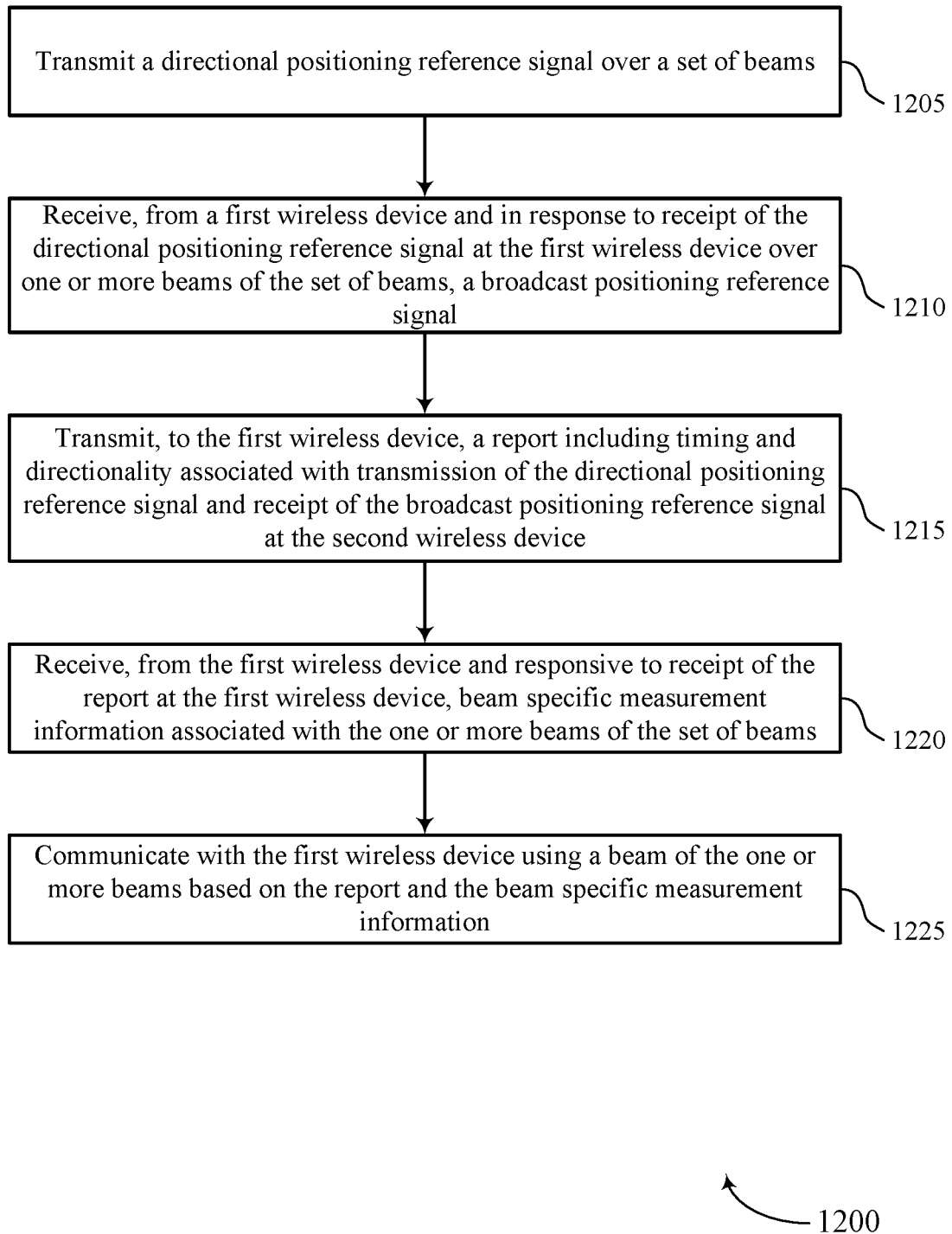

FIG. 12 shows a flowchart illustrating a method 1200 that supports bidirectional positioning reference signal measurement exchange in mmW-based RTT positioning in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may transmit a directional positioning reference signal over a set of beams. The operations of 1205 may be performed according to the methods described herein. In some examples, aspects of the operations of 1205 may be performed by a reference signal component as described with reference to FIGS. 6 through 9.

At 1210, the UE may receive, from a first wireless device and in response to receipt of the directional positioning reference signal at the first wireless device over one or more beams of the set of beams, a broadcast positioning reference signal. The operations of 1210 may be performed according to the methods described herein. In some examples, aspects of the operations of 1210 may be performed by a reference signal component as described with reference to FIGS. 6 through 9.

At 1215, the UE may transmit, to the first wireless device, a report including timing and directionality associated with transmission of the directional positioning reference signal and receipt of the broadcast positioning reference signal at the second wireless device. The operations of 1215 may be performed according to the methods described herein. In some examples, aspects of the operations of 1215 may be performed by a reporting component as described with reference to FIGS. 6 through 9.

At 1220, the UE may receive, from the first wireless device and responsive to receipt of the report at the first wireless device, beam specific measurement information associated with the one or more beams of the set of beams. The operations of 1220 may be performed according to the methods described herein. In some examples, aspects of the operations of 1220 may be performed by a measurement component as described with reference to FIGS. 6 through 9.

At 1225, the UE may communicate with the first wireless device using a beam of the one or more beams based on the report and the beam specific measurement information. The operations of 1225 may be performed according to the methods described herein. In some examples, aspects of the operations of 1225 may be performed by a beam component as described with reference to FIGS. 6 through 9.

Figure 13:
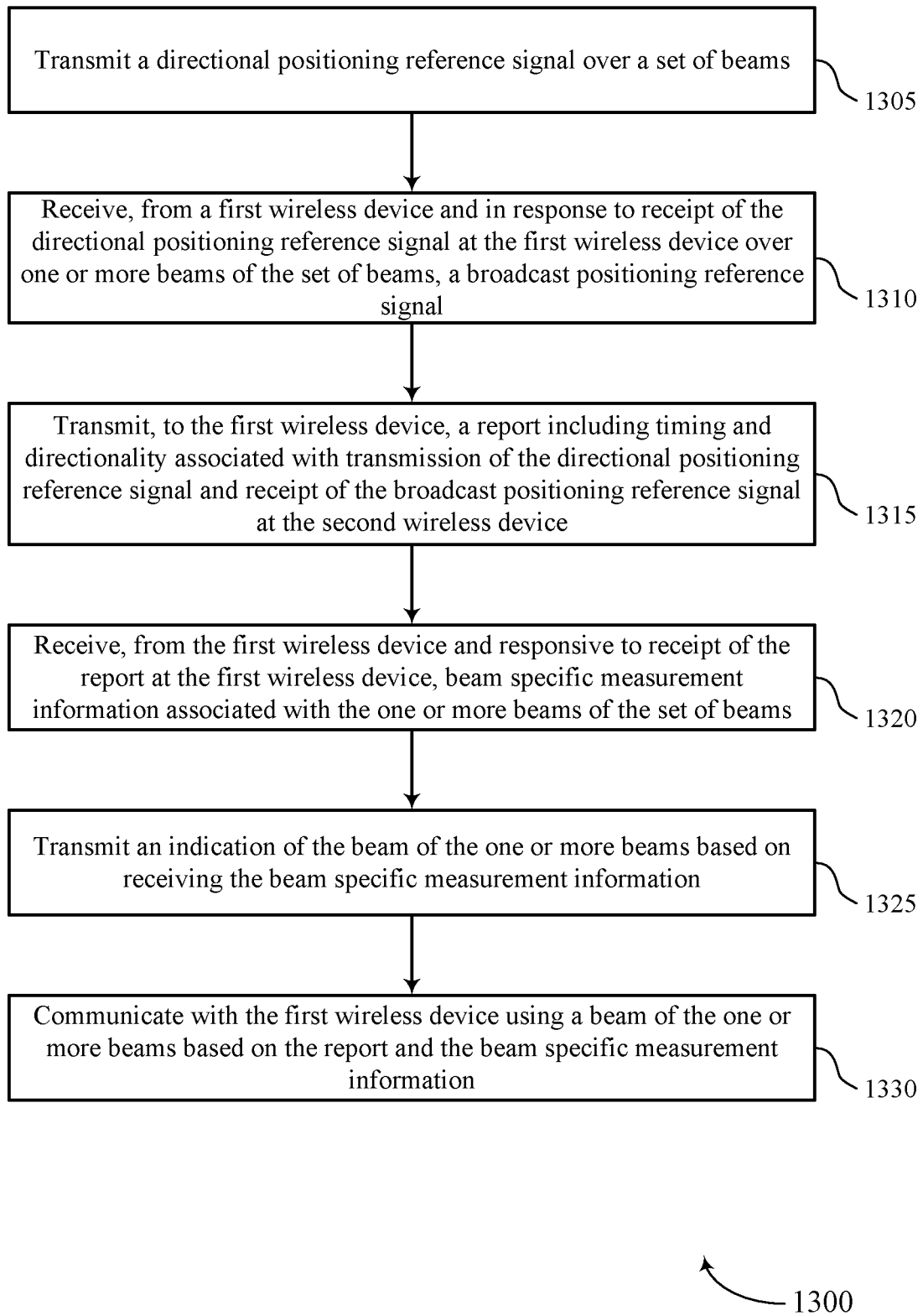

FIG. 13 shows a flowchart illustrating a method 1300 that supports bidirectional positioning reference signal measurement exchange in mmW-based RTT positioning in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE may transmit a directional positioning reference signal over a set of beams. The operations of 1305 may be performed according to the methods described herein. In some examples, aspects of the operations of 1305 may be performed by a reference signal component as described with reference to FIGS. 6 through 9.

At 1310, the UE may receive, from a first wireless device and in response to receipt of the directional positioning reference signal at the first wireless device over one or more beams of the set of beams, a broadcast positioning reference signal. The operations of 1310 may be performed according to the methods described herein. In some examples, aspects of the operations of 1310 may be performed by a reference signal component as described with reference to FIGS. 6 through 9.

At 1315, the UE may transmit, to the first wireless device, a report including timing and directionality associated with transmission of the directional positioning reference signal and receipt of the broadcast positioning reference signal at the second wireless device. The operations of 1315 may be performed according to the methods described herein. In some examples, aspects of the operations of 1315 may be performed by a reporting component as described with reference to FIGS. 6 through 9.

At 1320, the UE may receive, from the first wireless device and responsive to receipt of the report at the first wireless device, beam specific measurement information associated with the one or more beams of the set of beams. The beam specific measurement information may include a reference signal received power value for each beam of the one or more beams associated with the directional positioning reference signal. In some aspects, the beam specific measurement information may include a rank associated with each beam of the one or more beams with respect to at least the reference signal received power values. The operations of 1320 may be performed according to the methods described herein. In some examples, aspects of the operations of 1320 may be performed by a measurement component as described with reference to FIGS. 6 through 9.

At 1325, the UE may transmit an indication of the beam of the one or more beams based on receiving the beam specific measurement information. The operations of 1325 may be performed according to the methods described herein. In some examples, aspects of the operations of 1325 may be performed by a beam component as described with reference to FIGS. 6 through 9.

At 1330, the UE may communicate with the first wireless device using a beam of the one or more beams based on the report and the beam specific measurement information. The operations of 1330 may be performed according to the methods described herein. In some examples, aspects of the operations of 1330 may be performed by a beam component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following examples are given by way of illustration. Aspects of the following examples may be combined with aspects or embodiments shown or discussed in relation to the figures or elsewhere herein.

Aspect 1: A method for wireless communication at a first wireless device, comprising: receiving a directional positioning reference signal over one or more beams of a set of beams; transmitting a broadcast positioning reference signal in response to receipt of the directional positioning reference signal; receiving, from a second wireless device, a report comprising timing and directionality associated with transmission of the directional positioning reference signal and receipt of the broadcast positioning reference signal at the second wireless device; transmitting, to the second wireless device and responsive to receipt of the report, beam specific measurement information associated with the one or more beams of the set of beams; and communicating with the second wireless device using a beam of the one or more beams based at least in part on the report and the beam specific measurement information.

Aspect 2: The method of aspect 1, further comprising: determining a reference signal received power value for each beam of the one or more beams based at least in part on receipt of the directional positioning reference signal over each of the one or more beams; and assigning a rank to each of the one or more beams based at least in part on a corresponding reference signal received power value determined for the one or more beams.

Aspect 3: The method of aspect 2, further comprising: transmitting at least one of the determined reference signal received power value or the assigned rank for at least one of the one or more beams.

Aspect 4: The method of any of aspects 1 through 3, further comprising: transmitting at least one of a temporal instance and a direction associated with receipt of the directional positioning reference signal over the one or more beams.

Aspect 5: The method of any of aspects 1 through 4, further comprising: selecting the beam of the one or more beams based at least in part on reference signal received power values for the one or more beams; and transmitting at least one of a set of beam indexes or a beam pattern associated with each beam of the one or more beams.

Aspect 6: The method of any of aspects 1 through 5, further comprising: receiving an indication of the beam of the one or more beams based at least in part on transmitting the beam specific measurement information.

Aspect 7: The method of any of aspects 1 through 6, further comprising: receiving at least one of a temporal instance or a direction associated with transmission of the directional positioning reference signal over the one or more beams by the second wireless device; and receiving at least one of a temporal instance or a direction associated with reception of the broadcast positioning reference signal at the second wireless device.

Aspect 8: The method of any of aspects 1 through 7, wherein the first wireless device comprises a non-anchor device in an RTT positioning scheme; and the second wireless device comprises an anchor device in the RTT positioning scheme.

Aspect 9: The method of any of aspects 1 through 8, wherein the first wireless device comprises a non-anchor device in an RTT positioning scheme; and the second wireless device comprises another non-anchor device in the RTT positioning scheme.

Aspect 10: The method of any of aspects 1 through 9, wherein the second wireless device comprises an RSU in an RTT positioning scheme.

Aspect 11: A method for wireless communication at a second wireless device, comprising: transmitting a directional positioning reference signal over a set of beams; receiving, from a first wireless device and in response to receipt of the directional positioning reference signal at the first wireless device over one or more beams of the set of beams, a broadcast positioning reference signal; transmitting, to the first wireless device, a report comprising timing and directionality associated with transmission of the directional positioning reference signal and receipt of the broadcast positioning reference signal at the second wireless device; receiving, from the first wireless device and responsive to receipt of the report at the first wireless device, beam specific measurement information associated with the one or more beams of the set of beams; and communicating with the first wireless device using a beam of the one or more beams based at least in part on the report and the beam specific measurement information.

Aspect 12: The method of aspect 11, wherein the beam specific measurement information comprises at least one of: a reference signal received power value for each beam of the one or more beams associated with the directional positioning reference signal; or a rank associated with each beam of the one or more beams with respect to at least the reference signal received power values.

Aspect 13: The method of any of aspects 11 through 12, wherein the beam specific measurement information further comprises at least one of a temporal instance or a direction associated with the directional positioning reference signal as received over the one or more beams by the first wireless device.

Aspect 14: The method of any of aspects 11 through 13, further comprising: receiving at least one of a set of beam indexes or a beam pattern associated with each beam of the one or more beams.

Aspect 15: The method of any of aspects 11 through 14, further comprising: transmitting an indication of the beam of the one or more beams based at least in part on receiving the beam specific measurement information.

Aspect 16: The method of any of aspects 11 through 15, further comprising: transmitting at least one of a temporal instance or a direction associated with transmitting the directional positioning reference signal over the one or more beams; and transmitting at least one of a temporal instance or a direction associated with reception of the broadcast positioning reference signal at the second wireless device.

Aspect 17: The method of any of aspects 11 through 16, wherein the first wireless device comprises a non-anchor device in an RTT positioning scheme; and the second wireless device comprises an anchor device in the RTT positioning scheme.

Aspect 18: The method of any of aspects 11 through 17, wherein the first wireless device comprises a non-anchor device in an RTT positioning scheme; and the second wireless device comprises another non-anchor device in the RTT positioning scheme.

Aspect 19: The method of any of aspects 11 through 18, wherein the second wireless device comprises an RSU in an RTT positioning scheme.

Aspect 20: An apparatus for wireless communication at a first wireless device, comprising one or more transceivers, one or more memory, and one or more processors electronically coupled to the one or more memory and the one or more transceivers; and the one or more processors configured to perform a method of any of aspects 1 through 10.

Aspect 21: An apparatus for wireless communication at a first wireless device, comprising at least one means for performing a method of any of aspects 1 through 10.

Aspect 22: A non-transitory computer-readable medium storing code for wireless communication at a first wireless device, the code comprising instructions executable by a processor to perform a method of any of aspects 1 through 10.

Aspect 23: An apparatus for wireless communication at a second wireless device, comprising one or more transceivers, one or more memory, and one or more processors electronically coupled to the one or more memory and the one or more transceivers; and the one or more processors configured to perform a method of any of aspects 11 through 19.

Aspect 24: An apparatus for wireless communication at a second wireless device, comprising at least one means for performing a method of any of aspects 11 through 19.

Aspect 25: A non-transitory computer-readable medium storing code for wireless communication at a second wireless device, the code comprising instructions executable by a processor to perform a method of any of aspects 11 through 19.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first wireless device, comprising:
   one or more transceivers;
   one or more memory; and
   one or more processors electronically coupled to the one or more memory and the one or more transceivers, the one or more processors configured to:
      receive, via the one or more transceivers, a directional positioning reference signal over one or more beams of a set of beams;
      transmit, via the one or more transceivers, a broadcast positioning reference signal in response to receipt of the directional positioning reference signal;
      receive, via the one or more transceivers and from a second wireless device, a report comprising timing and directionality associated with transmission of the directional positioning reference signal and receipt of the broadcast positioning reference signal at the second wireless device;
      transmit, via the one or more transceivers and to the second wireless device and responsive to receipt of the report, beam specific measurement information associated with the one or more beams of the set of beams; and communicate with the second wireless device using a beam of the one or more beams based at least in part on the report and the beam specific measurement information.

2. The apparatus of claim 1, wherein the one or more processors are further configured to:
determine a reference signal received power value for each beam of the one or more beams based at least in part on receipt of the directional positioning reference signal over each of the one or more beams; and
assign a rank to each of the one or more beams based at least in part on a corresponding reference signal received power value determined for the one or more beams.

3. The apparatus of claim 2, wherein the one or more processors configured to transmit the beam specific measurement information are further configured to transmit at least one of the determined reference signal received power value or the assigned rank for at least one of the one or more beams.

4. The apparatus of claim 1, wherein the one or more processors configured to transmit the beam specific measurement information are further configured to:
transmit at least one of a temporal instance and a direction associated with receipt of the directional positioning reference signal over the one or more beams.

5. The apparatus of claim 1, wherein the one or more processors are further configured to:
select the beam of the one or more beams based at least in part on reference signal received power values for the one or more beams,
wherein the one or more processors configured to transmit the beam specific measurement information are further configured to transmit at least one of a set of beam indexes or a beam pattern associated with each beam of the one or more beams.

6. The apparatus of claim 1, wherein the one or more processors are further configured to:
receive, via the one or more transceivers, an indication of the beam of the one or more beams based at least in part on transmitting the beam specific measurement information.

7. The apparatus of claim 1, wherein the one or more processors are further configured to:
receive, via the one or more transceivers, at least one of a temporal instance or a direction associated with transmission of the directional positioning reference signal over the one or more beams by the second wireless device; and
receive, via the one or more transceivers, at least one of a temporal instance or a direction associated with reception of the broadcast positioning reference signal at the second wireless device.

8. The apparatus of claim 1, wherein:
the first wireless device comprises a non-anchor device in a round trip time (RTT) positioning scheme; and
the second wireless device comprises an anchor device in the RTT positioning scheme.

9. The apparatus of claim 1, wherein:
the first wireless device comprises a non-anchor device in a round trip time (RTT) positioning scheme; and
the second wireless device comprises another non-anchor device in the RTT positioning scheme.

10. The apparatus of claim 1, wherein the second wireless device comprises a roadside unit (RSU) in a round trip time (RTT) positioning scheme.

11. An apparatus for wireless communication at a second wireless device, comprising:
one or more transceivers,
one or more memory; and
one or more processors electronically coupled to the one or more memory and the one or more transceivers, the one or more processors configured to:
transmit, via the one or more transceivers, a directional positioning reference signal over a set of beams;
receive, via the one or more transceivers and from a first wireless device and in response to receipt of the directional positioning reference signal at the first wireless device over one or more beams of the set of beams, a broadcast positioning reference signal;
transmit, via the one or more transceivers and to the first wireless device, a report comprising timing and directionality associated with transmission of the directional positioning reference signal and receipt of the broadcast positioning reference signal at the second wireless device;
receive, via the one or more transceivers and from the first wireless device and responsive to receipt of the report at the first wireless device, beam specific measurement information associated with the one or more beams of the set of beams; and
communicate with the first wireless device using a beam of the one or more beams based at least in part on the report and the beam specific measurement information.

12. The apparatus of claim 11, wherein the beam specific measurement information comprises at least one of:
a reference signal received power value for each beam of the one or more beams associated with the directional positioning reference signal; or
a rank associated with each beam of the one or more beams with respect to at least the reference signal received power values.

13. The apparatus of claim 11, wherein the beam specific measurement information further comprises at least one of a temporal instance or a direction associated with the directional positioning reference signal as received over the one or more beams by the first wireless device.

14. The apparatus of claim 11, wherein the one or more processors configured to receive the beam specific measurement information are further configured to receive at least one of a set of beam indexes or a beam pattern associated with each beam of the one or more beams.

15. The apparatus of claim 11, wherein the one or more processors are further configured to:
transmit, via the one or more transceivers, an indication of the beam of the one or more beams based at least in part on receiving the beam specific measurement information.

16. The apparatus of claim 11, wherein the one or more processors configured to transmit the report are further configured to:
transmit at least one of a temporal instance or a direction associated with transmitting the directional positioning reference signal over the one or more beams; and
transmit at least one of a temporal instance or a direction associated with reception of the broadcast positioning reference signal at the second wireless device.

17. The apparatus of claim 11, wherein:
the first wireless device comprises a non-anchor device in a round trip time (RTT) positioning scheme; and
the second wireless device comprises an anchor device in the RTT positioning scheme.

18. The apparatus of claim 11, wherein:
the first wireless device comprises a non-anchor device in a round trip time (RTT) positioning scheme; and
the second wireless device comprises another non-anchor device in the RTT positioning scheme.

19. The apparatus of claim 11, wherein the second wireless device comprises a roadside unit (RSU) in a round trip time (RTT) positioning scheme.

20. A method for wireless communication at a first wireless device, comprising:
receiving a directional positioning reference signal over one or more beams of a set of beams;
transmitting a broadcast positioning reference signal in response to receipt of the directional positioning reference signal;
receiving, from a second wireless device, a report comprising timing and directionality associated with transmission of the directional positioning reference signal and receipt of the broadcast positioning reference signal at the second wireless device;
transmitting, to the second wireless device and responsive to receipt of the report, beam specific measurement information associated with the one or more beams of the set of beams; and
communicating with the second wireless device using a beam of the one or more beams based at least in part on the report and the beam specific measurement information.

21. The method of claim 20, further comprising:
determining a reference signal received power value for each beam of the one or more beams based at least in part on receipt of the directional positioning reference signal over each of the one or more beams; and
assigning a rank to each of the one or more beams based at least in part on the reference signal received power values determined for the one or more beams.

22. The method of claim 21, wherein the transmitting the beam specific measurement information comprises:
transmitting at least one of the determined reference signal received power value or the assigned rank for at least one of the one or more beams.

23. The method of claim 20, wherein the transmitting the beam specific measurement information comprises:
transmitting at least one of a temporal instance or a direction associated with receipt of the directional positioning reference signal over the one or more beams.

24. The method of claim 20, further comprising:
selecting the beam of the one or more beams based at least in part on reference signal received power values for the one or more beams,
wherein the transmitting the beam specific measurement information comprises transmitting at least one of a set of beam indexes or a beam pattern associated with each beam of the one or more beams.

25. The method of claim 20, further comprising:
receiving an indication of the beam of the one or more beams based at least in part on the transmitting the beam specific measurement information.

26. The method of claim 20, wherein the receiving the report comprises:
receiving at least one of a temporal instance or a direction associated with transmission of the directional positioning reference signal over the one or more beams by the second wireless device; and
receiving at least one of a temporal instance or a direction associated with reception of the broadcast positioning reference signal at the second wireless device.

27. The method of claim 20, wherein:
the first wireless device comprises a non-anchor device in a round trip time (RTT) positioning scheme; and
the second wireless device comprises an anchor device in the RTT positioning scheme.

28. The method of claim 20, wherein:
the first wireless device comprises a non-anchor device in a round trip time (RTT) positioning scheme; and
the second wireless device comprises another non-anchor device in the RTT positioning scheme.

29. The method of claim 20, wherein the second wireless device comprises a roadside unit (RSU) in a round trip time (RTT) positioning scheme.

30. A method for wireless communication at a second wireless device, comprising:
transmitting a directional positioning reference signal over a set of beams;
receiving, from a first wireless device and in response to receipt of the directional positioning reference signal at the first wireless device over one or more beams of the set of beams, a broadcast positioning reference signal;
transmitting, to the first wireless device, a report comprising timing and directionality associated with transmission of the directional positioning reference signal and receipt of the broadcast positioning reference signal at the second wireless device;
receiving, from the first wireless device and responsive to receipt of the report at the first wireless device, beam specific measurement information associated with the one or more beams of the set of beams; and
communicating with the first wireless device using a beam of the one or more beams based at least in part on the report and the beam specific measurement information.

* * * * *